(12) United States Patent
Weston et al.

(10) Patent No.: US 6,761,637 B2
(45) Date of Patent: Jul. 13, 2004

(54) METHOD OF GAME PLAY USING RFID TRACKING DEVICE

(75) Inventors: Denise Chapman Weston, Wakefield, RI (US); Jonathan A. Barney, Newport Beach, CA (US)

(73) Assignee: Creative Kingdoms, LLC, Wakefield, RI (US)

(*) Notice: Subject to any disclaimer, the term of this patent is extended or adjusted under 35 U.S.C. 154(b) by 193 days.

(21) Appl. No.: 09/792,282

(22) Filed: Feb. 22, 2001

(65) Prior Publication Data

US 2001/0034257 A1 Oct. 25, 2001

Related U.S. Application Data

(60) Provisional application No. 60/184,128, filed on Feb. 22, 2000.

(51) Int. Cl.[7] ................................................ A63F 13/00
(52) U.S. Cl. ............................. 463/42; 463/1; 463/43; 472/136; 482/35
(58) Field of Search ................................ 463/40, 41, 42, 463/43, 1; 273/440; 472/128, 136, 133, 137; 482/35, 36

(56) References Cited

U.S. PATENT DOCUMENTS

| | | | | |
|---|---|---|---|---|
| 4,858,930 A | * | 8/1989 | Sato .............................. | 463/43 |
| 5,114,155 A | | 5/1992 | Tillery et al. | |
| 5,482,510 A | | 1/1996 | Ishii et al. | |
| 5,498,002 A | | 3/1996 | Gechter | |
| 5,655,053 A | * | 8/1997 | Renie .......................... | 386/117 |
| 5,810,666 A | | 9/1998 | Mero et al. | |
| 5,830,065 A | | 11/1998 | Sitrick | |
| 5,836,817 A | | 11/1998 | Acres et al. | |
| 5,851,149 A | | 12/1998 | Xidos et al. | |
| 5,853,332 A | | 12/1998 | Briggs | |
| 5,855,483 A | | 1/1999 | Collins et al. | |
| 5,865,680 A | | 2/1999 | Briggs | |
| 5,964,660 A | | 10/1999 | James et al. | |
| 5,996,033 A | | 11/1999 | Chiu-Hao | |
| 6,009,458 A | | 12/1999 | Hawkins et al. | |
| 6,200,216 B1 | * | 3/2001 | Peppel ........................... | 463/1 |
| 6,283,871 B1 | | 9/2001 | Briggs | |
| 6,302,793 B1 | | 10/2001 | Fertitta, III et al. | |
| 6,328,648 B1 | | 12/2001 | Walker et al. | |
| 6,352,478 B1 | * | 3/2002 | Gabai et al. ................... | 463/42 |
| 6,375,578 B1 | | 4/2002 | Briggs | |
| 6,490,409 B1 | * | 12/2002 | Walker ......................... | 386/117 |
| 2002/0052238 A1 | * | 5/2002 | Muroi .......................... | 463/40 |
| 2002/0158751 A1 | * | 10/2002 | Bormaster ................... | 340/10.2 |

OTHER PUBLICATIONS

Pajama Sam: No Need To Hide When It's Dark Outside Infogrames Sep. 6, 2002.
Digital ID Cards The next generation of 'smart' cards will have more than a one-track mind Wall Street Journal Jun. 25, 2001.
Raise Hid The 3D Roof Beam BusinessWeek Nov. 26, 2001.
Tech Designers Rethink Toys: Make Them Fun Wall Street Journal Dec. 17, 2001.

* cited by examiner

*Primary Examiner*—Jessica Harrison
(74) *Attorney, Agent, or Firm*—Jonathan A. Barney

(57) ABSTRACT

A method of interactive game play is provided wherein a seemingly magical wand toy is provided for enabling a trained user to electronically send and receive information to and from other wand toys, a master system and/or to actuate various play effects within a play environment. The toy wand or other seemingly magical object is configured to use a send/received radio frequency communications protocol which provides a basic foundation for a complex, interactive entertainment system to create a seemingly magical interactive play experience.

77 Claims, 14 Drawing Sheets

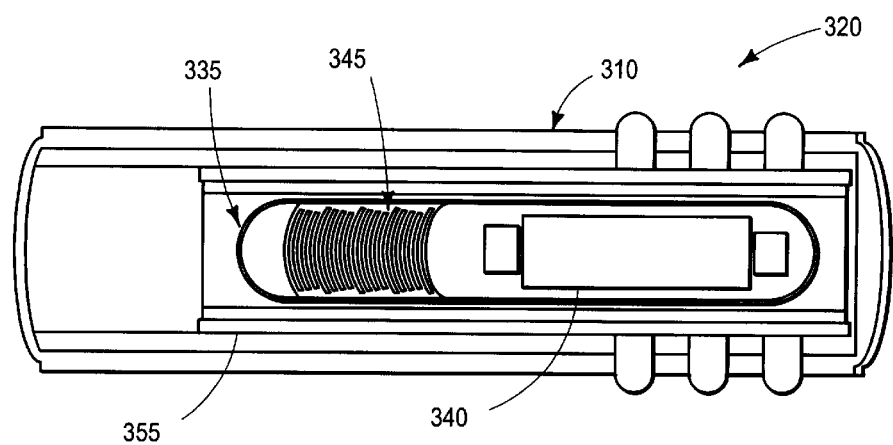
FIG. 2C
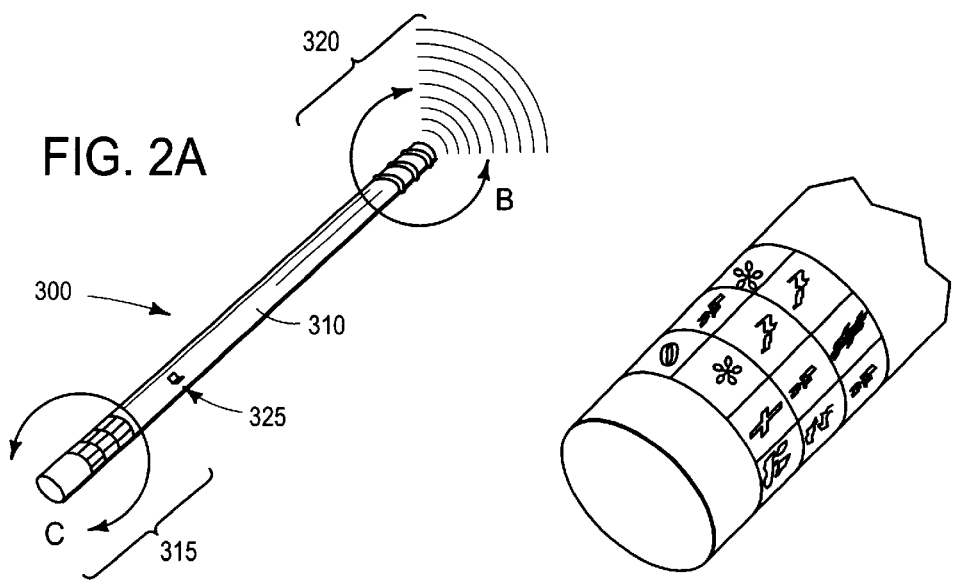
FIG. 2A
FIG. 2B

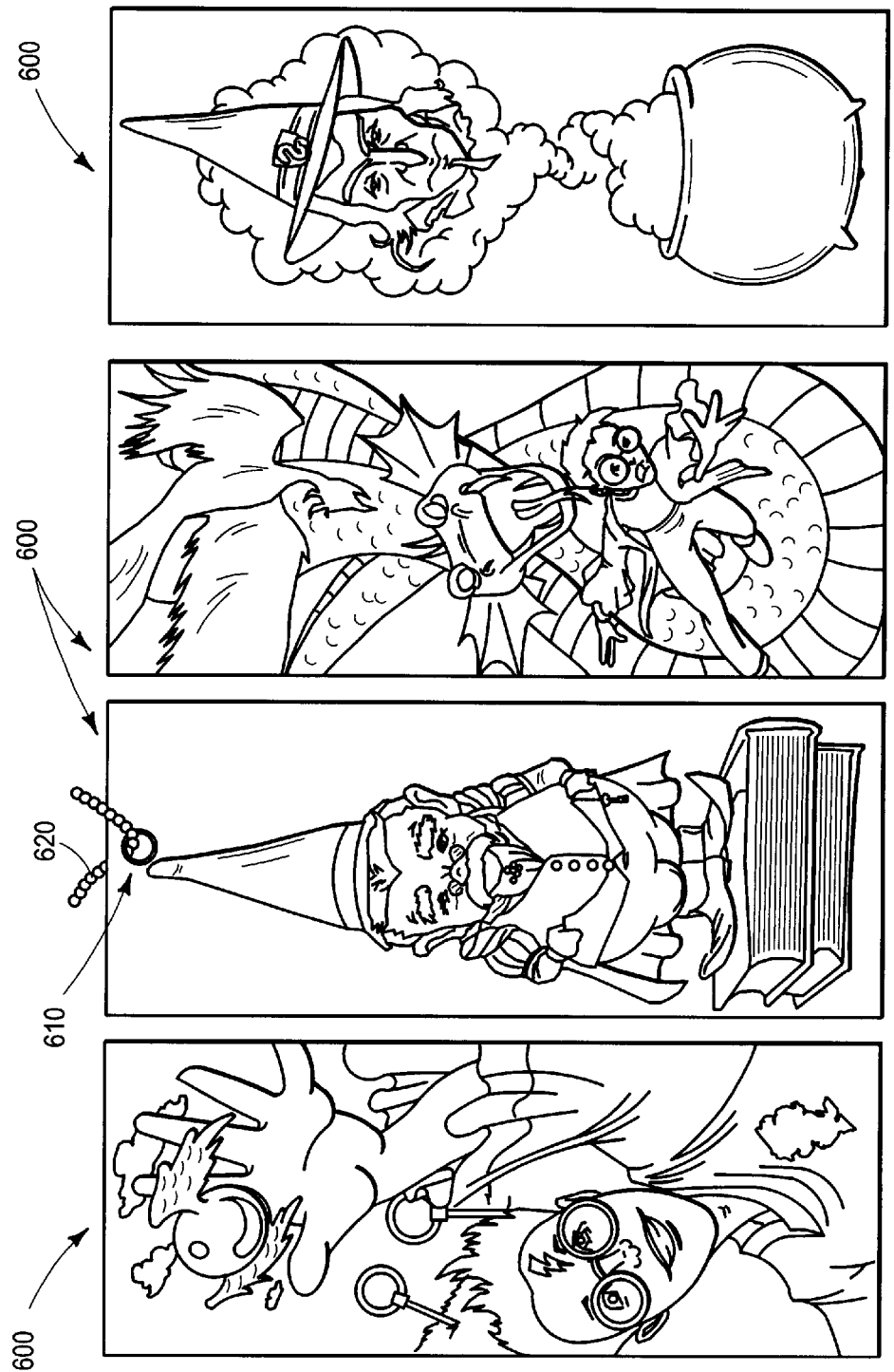

US 6,761,637 B2

METHOD OF GAME PLAY USING RFID TRACKING DEVICE

RELATED APPLICATIONS

This application claims priority to U.S. provisional application Ser. No. 60/184,128, filed Feb. 22, 2000.

BACKGROUND OF THE INVENTION

1. Field of the Invention

The present invention relates to children's' play toys and games and, in particular, to interactive toys, games and play systems utilizing radio frequency transponders and transceivers to provide a unique interactive game play experience.

2. Description of the Related Art

Family entertainment centers, play structures and other similar facilities are well known for providing play and interaction among play participants playing in, or around an entertainment facility and/or play structure. See, for example, U.S. Pat. No. 5,853,332 to Briggs, incorporated herein by reference. A wide variety of commercially available play toys and games are also known for providing valuable learning and entertainment opportunities for children, such as role playing, reading, memory stimulation, tactile coordination and the like.

However, there is always a demand for more exciting and entertaining games and toys that increase the learning and entertainment opportunities for children and stimulate creativity and imagination.

SUMMARY OF THE INVENTION

The present invention provides a unique method of game play carried out within either an existing or specially configured entertainment facility or play structure. The game utilizes an interactive "wand" and/or other tracking/actuation device to allow play participants to electronically and "magically" interact with their surrounding play environment(s). The play environment may either be real or imaginary (i.e. computer/TV generated), and either local or remote, as desired. Optionally, multiple play participants, each provided with a suitable "wand" and/or tracking device, may play and interact together, either within or outside the play environment, to achieve desired goals or produce desired effects within the play environment.

In accordance with one embodiment the present invention provides an interactive play system and seemingly magical wand toy for enabling a trained user to electronically send and receive information to and from other wand toys and/or to and from various transceivers distributed throughout a play facility and/or connected to a master control system. The toy wand or other seemingly magical object is configured to use a send/receive radio frequency communication protocol which provides a basic foundation for a complex, interactive entertainment system to create a seemingly magic interactive play experience for play participants who possess and learn to use the magical wand toy.

In accordance with another embodiment the present invention provides an interactive play structure in the theme of a "magic" training center for would-be wizards in accordance with the popular characters and storylines of the children's book series "Harry Potter" by J. K Rowling. Within the play structure, play participants learn to use a "magic wand" and/or other tracking/actuation device. The wand allows play participants to electronically and "magically" interact with their surrounding play environment simply by pointing or using their wands in a particular manner to achieve desired goals or produce desired effects within the play environment. Various receivers or transceivers are distributed throughout the play structure to facilitate such interaction via wireless communications.

In accordance with another embodiment the present invention provides a wand actuator device for actuating various interactive play effects within an RFID-compatible play environment. The wand comprises an elongated hollow pipe or tube having a proximal end or handle portion and a distal end or transmitting portion. An internal cavity may be provided to receive one or more batteries to power optional lighting, laser or sound effects and/or to power long-range transmissions such as via an infrared LED transmitter device or RF transmitter device. The distal end of the wand is fitted with an RFID (radio frequency identification device) transponder that is operable to provide relatively short-range RF communications (<60 cm) with one or more receivers or transceivers distributed throughout a play environment. The handle portion of the wand is fitted with optional combination wheels having various symbols and/or images thereon which may be rotated to produce a desired pattern of symbols required to operate the wand or achieve one or more special effects.

In accordance with another embodiment the present invention provides an RFID card or badge intended to be affixed or adhered to the front of a shirt or blouse worn by a play participant while visiting an RF equipped play facility. The badge comprises a paper, cardboard or plastic substrate having a front side and a back side. The front side may be imprinted with graphics, photos, or any other information desired. The front side may include any number of other designs or information pertinent to its application. The obverse side of the badge contains certain electronics comprising a radio frequency tag pre-programmed with a unique person identifier number ("UPIN"). The UPIN may be used to identify and track individual play participants within the play facility. Optionally, each tag may also include a unique group identifier number ("UGIN") which may be used to match a defined group of individuals having a predetermined relationship.

In accordance with another embodiment the present invention provides an electronic role-play game utilizing specially configured electronically readable character cards. Each card is configured with an RFID or a magnetic "swipe" strip or the like, that may be used to store certain information describing the powers or abilities of an imaginary role-play character that the card represents. As each play participant uses his or her favorite character card in various play facilities the character represented by the card gains (or loses) certain attributes, such as magic skill level, magic strength, flight ability, various spell-casting abilities, etc. All of this information is preferably stored on the card so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

In accordance with another embodiment the present invention provides a trading card game wherein a plurality of cards depicting various real or imaginary persons, characters and/or objects are provided and wherein each card has recorded or stored thereon in an electronically readable format certain selected information pertaining to the particular person, character or object, such as performance statistics, traits/powers, or special abilities. The information is preferably stored on an RFID tracking tag associated with each card and which can be read electronically and wirelessly over a predetermined range preferably greater than about 1 cm when placed in the proximity of a suitably configured RF reader. Optionally, the RFID tag may be read/write capable such that it the information stored thereon may be changed or updated in any manner desired. Alternatively, a magnetic strip, bar code or similar information storage means may be used to store relevant information on the card.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 2A is a perspective view of a magic wand toy for use within the interactive play structure of FIG. 1 having features and advantages in accordance with the present invention;

FIG. 2B is a partially exploded detail view of the proximal end or handle portion of the magic wand toy of FIG. 2A, illustrating the optional provision of combination wheels having features and advantages in accordance with the present invention;

FIG. 2C is a partial cross-section detail view of the distal end or transmitting portion of the magic wand toy of FIG. 2A, illustrating the provision of an RF transponder device therein;

FIGS. 8A–8D are front views of various role-play character cards for use within an interactive play structure such as illustrated in FIG. 1;

DETAILED DESCRIPTION OF THE PREFERRED EMBODIMENTS

Basic System and Framework

Figure 1:
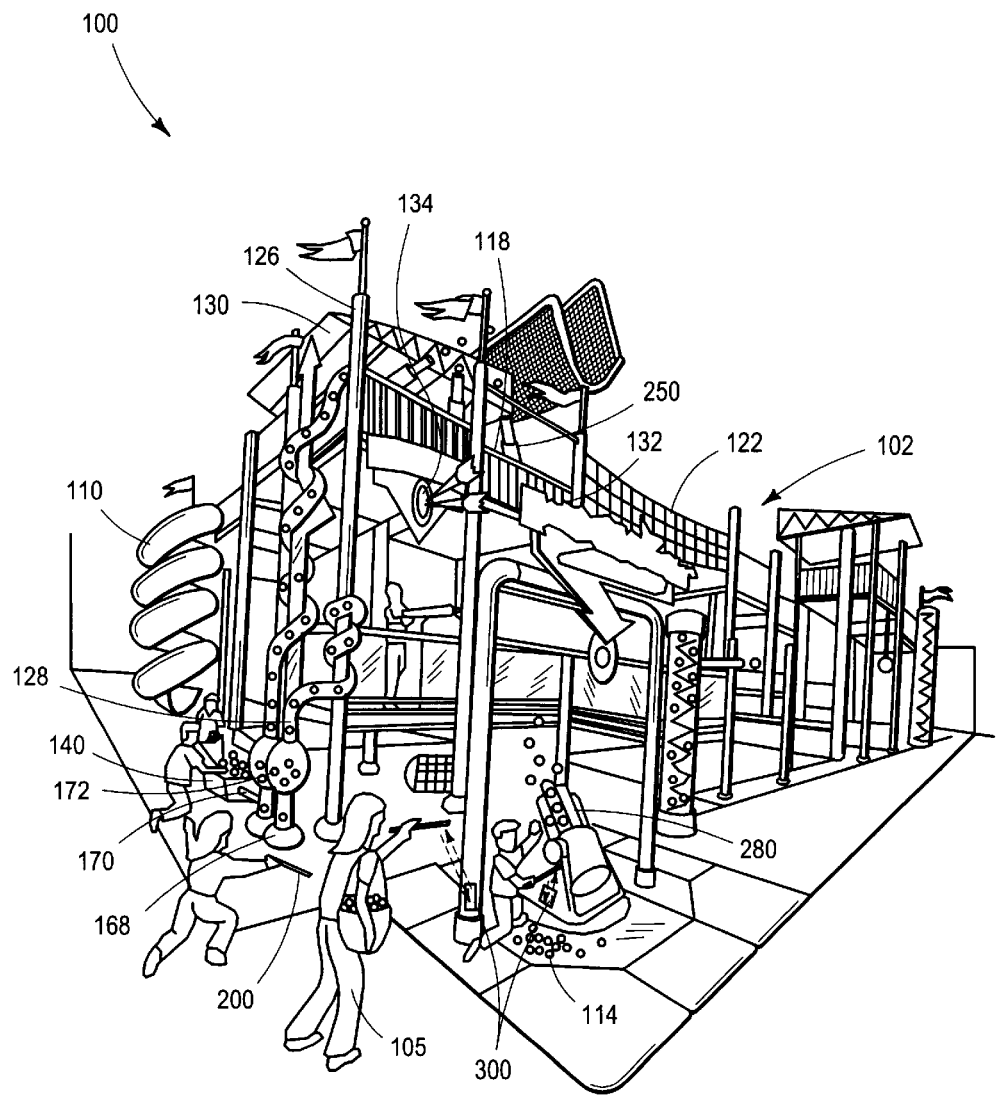
FIG. 1 is a perspective view of an interactive play structure modified to incorporate certain features and advantages in accordance with the present invention.

FIG. 1 illustrates one preferred embodiment of an interactive play structure 100 having features and advantages in accordance with the present invention. The particular play structure illustrated takes on the theme of a "magic" training center for would-be wizards in accordance with the popular characters and storylines of the children's book series "Harry Potter" by J. K Rowling. Within this play structure 100, play participants 105 learn to use a "magic wand" 200 and/or other tracking/actuation device. The wand 200 allows play participants to electronically and "magically" interact with their surrounding play environment simply by pointing or using their wands in a particular manner to achieve desired goals or produce desired effects within the play environment. Various receivers or transceivers 300 are distributed throughout the play structure 100 to facilitate such interaction via wireless communications. Depending upon the degree of game complexity desired and the amount of information sharing required, the transceivers 300 may or may not be connected to a master system or central server (not shown). Preferably, most, if not all, of the receivers or transceivers 300 are stand-alone devices that do not require communications with an external server or network. In one particularly preferred embodiment this may be achieved by storing any information required to be shared on the wand 200 and/or on an associated radio frequency tracking card or badge worn or carried by the play participant (described later).

The play structure itself comprises a multi-level structure constructed using any one of an number of materials and construction techniques well known to those skilled in the art. The structure 100 may be suitable for either outdoor or indoor use, as desired. Preferably, the structure 100 comprises a supporting framework 102 formed from a plurality of interconnected support members 126, comprising columns, pylons, beams, connectors and the like. The support members 126 may be formed from any combination of convenient materials having sufficient strength and durability for safely supporting multiple play participants 105. For example, plastic or PVC pipes, steel pipes, I-beams or channel beams, reinforced concrete beams/columns, and the like may all be used to form the supporting framework 102.

For visual appeal and added safety, optional decorative panels, railings 132 and/or roofing elements 130 may be provided, as desired, to shade play participants 105 from the sun (for outdoor play structures), to prevent play participants from falling off the structure 100, or to complement a particular desired theme of the play structure 100. For instance, in the preferred embodiment shown in FIG. 1, various roof elements 130 and railings 132 are provided for added safety and to complement the theme of Harry Potter's "Hogwart School for Wizards." Decorative panels may be formed of wood, fiberglass or other reinforced fiber, PVC, aluminum, steel or a variety of other suitable materials, as desired. Corrosion-resistant materials are preferred, particularly if the play structure 100 is to be used outdoors. Of course, those skilled in the art will readily appreciate that a wide variety of other decorative or thematic elements may be incorporated into the overall design of the play structure 100 in order to provide added safety and/or to help convey a particular desired play theme.

Preferably, a suitable play media, such as foam or rubber balls or similar objects, is provided for use throughout the structure to provide a tactile interactive play experience. A number of conduits 128 or other transport means are preferably provided throughout the framework 102 for transporting play media to and from the various play areas in the play structure 100. The conduits 128 may be formed from plastic hosing or PVC pipes joined together using commercially available fittings, as is well known in the art. Conduits 128 may also be formed from a wide variety of other suitable materials such as steel pipe, ceramic/clay pipe, or they may be formed as open channels and/or runners, as desired. Clear or colored/transparent plastic pipes having an inner diameter of about 2⅛"–6½", and more preferably about 3–4", are particularly preferred for aesthetic appeal and added excitement. Alternatively, larger or smaller diameter conduits 128 or conduits 128 having different colors or shapes may be used, as desired, to accommodate various sizes and shapes of balls or other play media 114. Play media 114 may be conveniently transported by use of pressurized air or other suitable means, as desired. Various participant-operated or "magically" actuated conveyors may also be employed to circulate balls or other play media 114 from one area of the structure 100 to another, as desired.

The particular play structure shown in FIG. 1 utilizes thousands of soft foam balls as an interactive play medium 114. These may be manipulated by play participants using various interactive play elements to create desired effects. Balls may range in size from approximately 1" to 12" in diameter or larger, as desired, and are preferable about 2½" in diameter. Preferably, the balls are not so small as to present a choking hazard for young children. The majority of the balls may be the same size, or a mixture of ball sizes may be utilized, as desired. A few play elements, as described below, may utilize balls of a relatively large diameter (about 12" or more). Certain play elements may use only certain sized balls, with filtering relays (not shown) in the conduits 128 permitting only certain sized balls to roll to certain play areas. A range of colors for the balls may also be used for visual appeal. Optionally, ball sizes and/or types may be color-coded as desired to indicate their use with particular play elements or in certain play zones and/or for facilitating their return to the proper areas when they are removed.

Other suitable play media 114 may include, without limitation, foam, plastic or rubber balls and similarly formed articles such as cubes, plates, discs, tubes, cones, rubber or foam bullets/arrows, the present invention not being limited to any particular preferred play media. These may be used alone or in combination with one another. For instance, flying discs, such as Frisbees™, may be flung from one location on the play structure 100 while other play participants shoot at the discs using foam balls or suction-cup arrows. Wet or semi-wet play mediums, such as slime-like materials, snow, mud, squirt guns and/or water balloons may also used, as desired, to cool and entertain play participants. Durable plastic or rubber play media are preferable in an outdoor play structure where environmental exposure may prematurely destroy or degrade the quality of certain play mediums such as foam balls. The particular play media used is not particularly important for purposes of carrying out the invention and, optionally, may be omitted altogether, if desired.

Various electronic interactive play elements are disposed in, on and/or around the play structure 100 to allow play participants 105 to create desired "magical" effects, as illustrated in FIG. 1. These may include interactive elements such as projectile accelerators, cannons, interactive targets, fountains, geysers, cranes, filter relays, and the like for amusing and entertaining play participants and/or for producing various desired visual, aural or tactile effects. These may be actuated manually by play participants or, more desirably, "magically" electronically by appropriately using the wand 200 in conjunction with one or more transceivers 300. Some interactive play elements may have simple immediate effects, while others may have complex and/or delayed effects. Some play elements may produce local effects while others may produce remote effects. Each play participant 105, or sometimes a group of play participants working together, preferably must experiment with the various play elements and using their magic wands in order to discover how to create the desired effect(s). Once one play participant figures it out, he or she can use the resulting play effect to surprise and entertain other play participants. Yet other play participants will observe the activity and will attempt to also figure it out in order to turn the tables on the next group. Repeated play on a particular play element can increase the participants' skills in accurately using the wand 200 to produce desired effects or increasing the size or range of such effects. Optionally, play participants can compete with one another using the various play elements to see which participant or group of participants can create bigger, longer, more accurate or more spectacular effects.

A spherical, preferably clear, plastic relay 172 acts as a trap and/or filter selectively feeding play media 114 into a holding tank. This tank, in turn, provides play media 114 to the flexible hose 128. Dramatic visual effects are created as multi-colored balls and/or other play media 114 bounce around the interior of the relay 172 and are carried up through the spiraling conduit 128. The relay 172 may also be used to collect and/or filter play media 114 for further transmission along the various conduits 128 or to other play elements or conveyors as desired.

Other interactive play elements may include, for example and without limitation, a wand activated overhead reservoir for dumping balls or other play media 114 onto other play participants, a tray or channel for allowing balls or other play media 114 to roll down onto a target or other play participants, a bucket conveyor for lifting balls or other play media 114 from a lower collection basin to an elevated container for supplying other play elements, and various interactive targets.

The play structure 100 also preferably incorporates a number of other conventional (passive) play elements, such as climbing nets, crawl tunnels, swinging bridges, slides 110, and the like as shown in FIG. 1. These provide entertaining physical challenges and allow play participants to safely negotiate their way through the various areas of the play structure 100. Slides 110 may be provided at the front, rear, and/or sides of the play structure 100 and may be straight, curved, or spiral-shaped, as desired. They may also be enclosed and tube-like or open and exposed to flying play media, as desired. Alternatively, those skilled in the art will readily appreciate that the size, number, and location of the various slides 110 can be varied, as desired, while still enjoying the benefits and advantages of the present invention.

Multiple ball pits and the like may also be provided at various locations throughout the play structure. Those skilled in the art will readily appreciate that a wide variety of other passive play elements, such as funny mirrors, rotating tunnels, trampolines, climbing bars, swings, etc. may all be used to create a desired play environment for carrying out the features and advantages as of the present invention as taught herein.

While a particular preferred play environment and play structure 100 has been described, it will be readily apparent to those skilled in the art that a wide variety of other possible play environments, play structures, entertainment centers and the like may be used to create an interactive play environment within which the invention may be carried out. For instance, a suitable play structure may be constructed substantially entirely of molded or contoured concrete, fiberglass or plastic, as desired. Alternatively, a suitable play structure may be constructed entirely or partially from conduits or pipes which also transport play media to and from various locations throughout the play structure. Alternatively, the play environment need not comprise a play structure at all, but may be simply a themed play area, or even a multi-purpose area such as a restaurant dining facility, family room, bedroom or the like.

Magic Wand

As indicated above, play participants 105 within the play structure 100 learn to use a "magic wand" 200 and/or other tracking/actuation device. The wand 200 allows play participants to electronically and "magically" interact with their surrounding play environment simply by pointing or using their wands in a particular manner to achieve desired goals or produce desired effects within the play environment. Use of the wand 200 may be as simple as touching it to a particular surface or "magical" item within the play structure 100 or it may be as complex as shaking or twisting the wand a predetermined number of times in a particular manner and/or pointing it accurately at a certain target desired to be "magically" transformed or otherwise affected. As play participants play and interact within the play structure 100 they learn more about the "magical" powers possessed by the wand 200 and become more adept at using the wand to achieve desired goals or desired play effects. Optionally, play participants may collect points or earn additional magic levels or ranks for each play effect or task they successfully achieve. In this manner, play participants 105 may compete with one another to see who can score more points and/or achieve the highest magic level.

FIG. 2 illustrates the basic construction of one preferred embodiment of a "magic" wand 200 having features and advantages in accordance with one preferred embodiment of the invention. As illustrated in FIG. 2A the wand 200 basically comprises an elongated hollow pipe or tube 310 having a proximal end or handle portion 315 and a distal end or transmitting portion 320. If desired, an internal cavity may be provided to receive one or more batteries to power optional lighting, laser or sound effects and/or to power longer-range transmissions such as via an infrared LED transmitter device or RF transmitter device. An optional button 325 may also be provided, if desired, to enable particular desired functions, such as sound or lighting effects or longer-range transmissions.

FIG. 2B is a partially exploded detail view of the proximal end 315 of the magic wand toy 200 of FIG. 2A. As illustrated, the handle portion 315 is fitted with optional combination wheels having various symbols and/or images thereon. Preferably, certain wand functions may require that these wheels be rotated to produce a predetermined pattern of symbols such as three owls, or an owl, a broom and a moon symbol. Those skilled in the art will readily appreciate that the combination wheels may be configured to actuate electrical contacts and/or other circuitry within the wand 200 in order to provide the desired functionality. Alternatively, the combinations wheels may provide a simple security measure to prevent unauthorized users from actuating the wand.

FIG. 2C is a partial cross-section detail view of the distal end of magic wand toy 200 of FIG. 2A. As illustrated, the distal end 320 is fitted with an RFID (radio frequency identification device) transponder 335 that is operable to provide relatively short-range RF communications (<60 cm) with one or more of the receivers or transceivers 300 distributed throughout play structure 100 (FIG. 1). At its most basic level, RFID provides a wireless link to uniquely identify objects or people. It is sometimes called dedicated short range communication (DSRC). RFID systems include electronic devices called transponders or tags, and reader electronics to communicate with the tags. These systems communicate via radio signals that carry data either unidirectionally (read only) or, more preferably, bi-directionally (read/write). One suitable RFID transponder is the 134.2 kHz/123.2 kHz, 23 mm Glass Transponder available from Texas Instruments, Inc. (htt://www.tiris.com, Product No. RI TRP WRHP). This transponder basically comprises a passive (non-battery-operated) RF transmitter/receiver chip 340 and an antenna 345 provided within an hermetically sealed vial 350. A protective silicon sheathing 355 is preferably inserted around the sealed vial 350 between the vial and the inner wall of the tube 310 to insulate the transponder from shock and vibration.

Figure 3:
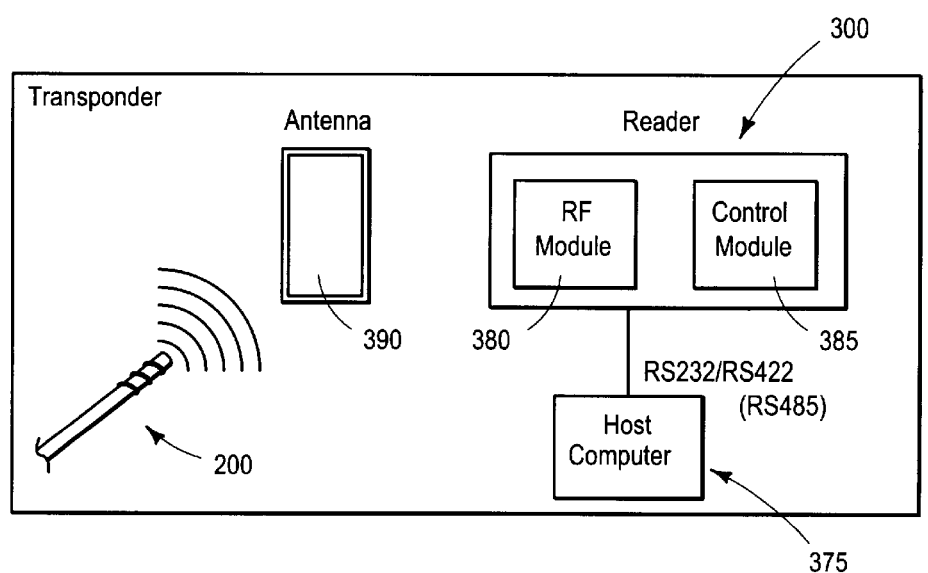
FIG. 3 is a simplified schematic diagram of an RF reader and master control system for use with the magic wand toy actuator of FIG. 2A having features and advantages in accordance with the present invention.

FIG. 3 is a simplified schematic diagram of one embodiment of an RF transceiver 300 (FIG. 1) and optional master control system 375 for use with the magic wand toy actuator of FIG. 2A. As illustrated, the transceiver 300 basically comprises an RF Module 380, a Control Module 385 and an antenna 390. When the distal end of wand 200 comes within a predetermined range of antenna 390 (~20–60 cm) the transponder antenna 345 (FIG. 2C) becomes excited and impresses a voltage upon the RF transmitter/receiver chip 340 disposed within transponder 335 at the distal end of the wand 200. In response, the RF transmitter/receiver chip 340 causes transponder antenna 345 to broadcast certain information stored within the transponder 335 comprising 80 bits of read/write memory. This information typically includes the users unique ID number, magic level or rank and/or certain other information pertinent to the user or the user's play experiences.

This information is initially received by RF Module 380, which can then transfer the information through standard interfaces to an optional Host Computer 375, Control Module 385, printer, or programmable logic controller for storage or action. If appropriate, Control Module 385 provides certain outputs to activate or control one or more associated play effects, such as lighting, sound, various mechanical or pneumatic actuators or the like. Optional Host Computer 375 processes the information and/or communicates it to other transceivers 300, as may be required by the game. If suitably configured, RF Module 380 may also broadcast or "write" certain information back to the transponder 335 to change or update one of more of the 80 read/write bits in its memory. This exchange of communications occurs very rapidly (~70 ms) and so from the user's perspective it appears to be instantaneous. Thus, the wand 200 may be used in this "short range" or "passive" mode to actuate various "magical" effects throughout the play structure 100 by simply touching or bringing the tip of the wand 200 into relatively close proximity with a particular transceiver 300. To provide added mystery and fun, certain transceivers 300 may be hidden within the play structure 100 so that they must be discovered by continually probing around the structure using the wand 200. The locations of the hidden transceivers may be changed from time to time to keep the game fresh and exciting.

If desired, the wand 200 may also be configured for long range communications with one or more of the transceivers 300 (or other receivers) disposed within the play structure 100. For example, one or more transceivers 300 may be located on a roof or ceiling surface, on an inaccessible theming element, or other area out of reach of play participants. Such long-rage wand operation may be readily achieved using an auxiliary battery powered RF transponder, such as available from Axcess, Inc., Dallas, Tex. If line of sight or directional actuation is desired, a battery-operated infrared LED transmitter and receiver of the type employed in television remote control may be used, as those skilled in the art will readily appreciate. Of course, a wide variety of other wireless communications devices, as well as various sound and lighting effects may also be provided, as desired. Any one or more of these may be actuated via button 325, as desirable or convenient.

Additional optional circuitry and/or position sensors may be added, if desired, to allow the "magic wand" 200 to be operated by waiving, shaking, stroking and/or tapping it in a particular manner. If provided, these operational aspects would need to be learned by play participants as they train in the various play environments. The ultimate goal, of course, is to become a "grand wizard" or master of the wand. This means that the play participant has learned and mastered every aspect of operating the wand to produce desired effects within each play environment. Of course, additional effects and operational nuances can (and preferably are) always added in order to keep the interactive experience fresh continually changing. Optionally, the wand 200 may be configured such that it is able to display 50 or more characters on a LTD or LCD screen. The wand may also be configured to respond to other signals, such as light, sound, or voice commands as will be readily apparent to those skilled in the art.

RFID Tracking Card/Badge

Figure 4A:
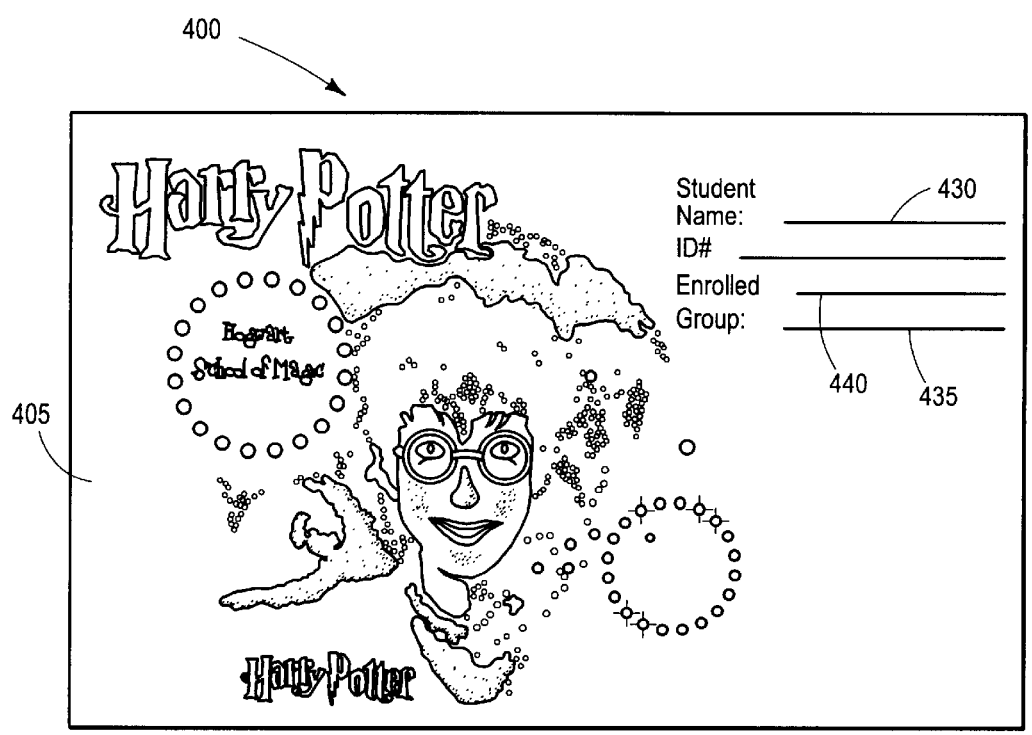
FIGS. 4A and 4B are front and rear views, respectively, of an optional RFID tracking badge or card for use within the interactive play structure of FIG. 1 having features and advantages in accordance with the present invention.
Figure 4B:
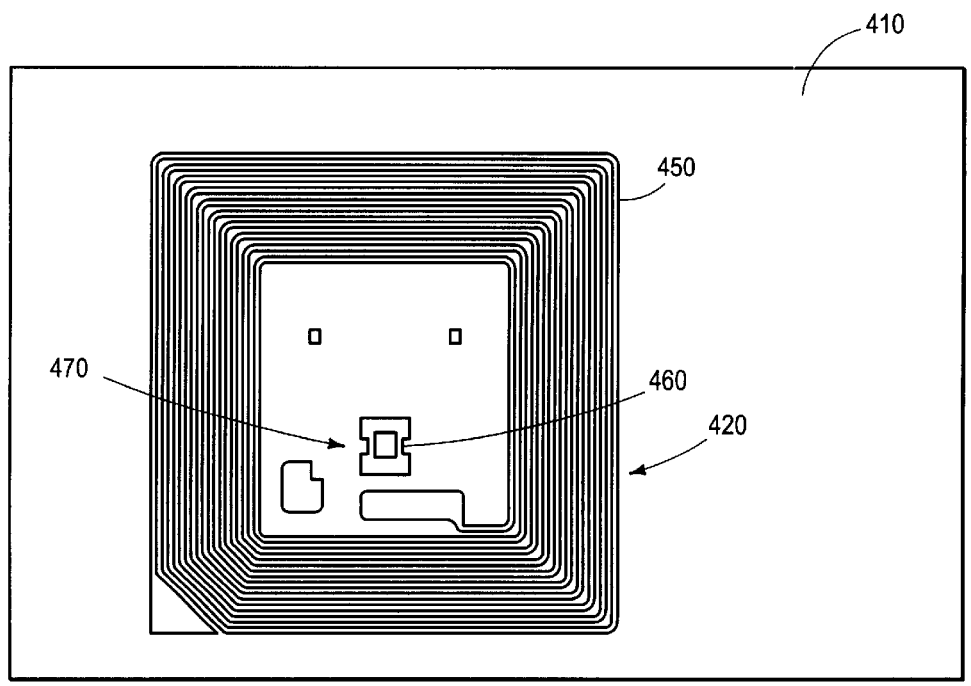

FIGS. 4A and 4B are front and rear views, respectively, of an optional or alternative RFID tracking badge or card 400 for use within the interactive play structure of FIG. 1. This may be used instead of or in addition to the wand 200, described above. The particular badge 400 illustrated is intended to be affixed or adhered to the front of a shirt or blouse worn by a play participant during their visit to suitably equipped play or entertainment facilities. The badge preferably comprises a paper, cardboard or plastic substrate having a front side 404 and a back side 410. The front 405 of each card/badge 400 may be imprinted with graphics, photos, or any other information desired. In the particular embodiment illustrated, the front 405 contains an image of Harry Potter in keeping with the overall theme of the play structure 100. In addition, the front 405 of the badge 400 may include any number of other designs or information pertinent to its application. For example, the guest's name 430, and group 435 may be indicated for convenient reference. A unique tag ID Number 440 may also be displayed for convenient reference and is particularly preferred where the badge 400 is to be reused by other play participants.

The obverse side 410 of the badge 400 contains the badge electronics comprising a radio frequency tag 420 pre-programmed with a unique person identifier number ("UPIN"). The tag 420 generally comprises a spiral wound antenna 450, a radio frequency transmitter chip 460 and various electrical leads and terminals 470 connecting the chip 460 to the antenna. Advantageously, the UPIN may be used to identify and track individual play participants within the play facility. Optionally, each tag 420 may also include a unique group identifier number ("UGIN") which may be used to match a defined group of individuals having a predetermined relationship—either preexisting or contrived for purposes of game play. If desired, the tag 420 may be covered with an adhesive paper label (not shown) or, alternatively, may be molded directly into a plastic sheet substrate comprising the card 400.

Various readers distributed throughout a park or entertainment facility are able to read the RFID tags 420. Thus, the UPIN and UGIN information can be conveniently read and provided to an associated master control system, display system or other tracking, recording or display device for purposes of creating a record of each play participant's experience within the play facility. This information may be used for purposes of calculating individual or team scores, tracking and/or locating lost children, verifying whether or not a child is inside a facility, photo capture & retrieval, and many other useful purposes as will be readily obvious and apparent to those skilled in the art.

Preferably, the tag 420 is passive (requires no batteries) so that it is inexpensive to purchase and maintain. Such tags and various associated readers and other accessories are commercially available in a wide variety of configurations, sizes and read ranges. RFID tags having a read range of between about 10 cm to about 100 cm are particularly preferred, although shorter or longer read ranges may also be acceptable. The particular tag illustrated is the 13.56 mHz tag sold under the brand name Taggit™ available from Texas Instruments, Inc. (http://www.tiris.com, Product No. RI-103–110A). The tag 420 has a useful read/write range of about 25 cm and contains 256-bits of on-board memory arranged in 8×32-bit blocks which may be programmed (written) and read by a suitably configured read/write device. Such tag device is useful for storing and retrieving desired user-specific information such as UPIN, UGIN, first and/or last name, age, rank or level, total points accumulated, tasks completed, facilities visited, etc. If a longer read/write range and/or more memory is desired, optional battery-powered tags may be used instead, such as available from ACXESS, Inc. and/or various other vendors known to those skilled in the art.

Figure 5A:
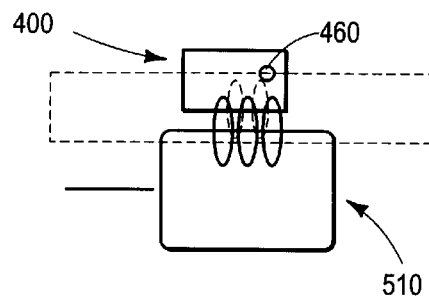
FIGS. 5A and 5B are schematic diagrams illustrating typical operation of the RFID tracking badge of FIG. 4.
Figure 5B:
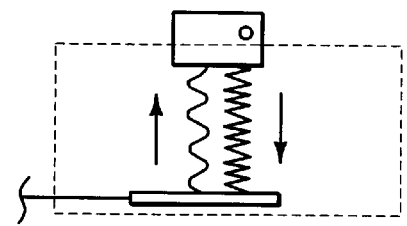
Figure 6:
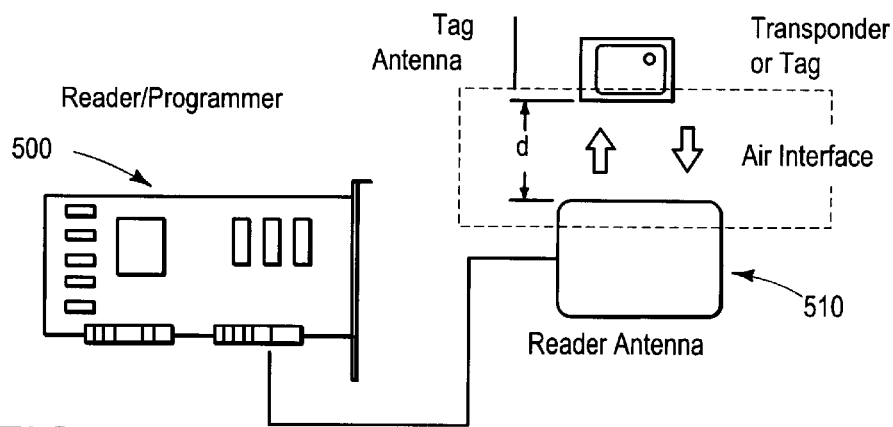
FIG. 6 is simplified schematic diagram of an RFID read/write system for use with the RFID tracking badge of FIG. 4 having features and advantages in accordance with the present invention.

FIGS. 5 and 6 are simplified schematic illustrations of tag and reader operation. The tag 420 is initially activated by a radio frequency signal broadcast by an antenna 510 of an adjacent reader or activation device 500. The signal impresses a voltage upon the antenna 450 by inductive coupling which is then used to power the chip 460 (see, e.g., FIG. 5A). When activated, the chip 460 transmits via radio frequency a unique identification number preferably corresponding to the UPIN and/or UGIN described above (see, e.g., FIG. 5B). The signal may be transmitted either by inductive coupling or, more preferably, by propagation coupling over a distance "d" determined by the range of the tag/reader combination. This signal is then received and processed by the associated reader 500 as described above. If desired, the RFID card or badge 400 may also be configured for read/write communications with an associated reader/writer. Thus, the unique tag identifier number (UPIN or UGIN) can be changed or other information may be added.

As indicated above, communication of data between a tag and a reader is by wireless communication. As a result, transmitting such data is always subject to the vagaries and influences of the media or channels through which the data has to pass, including the air interface. Noise, interference and distortion are the primary sources of data corruption that may arise. Thus, those skilled in the art will recognize that a certain degree of care should be taken in the placement and orientation of readers 500 so as to minimize the probability of such data transmission errors. Preferably, the readers are placed at least 30–60 cm away from any metal objects, power lines or other potential interference sources. Those skilled in the art will also recognize that the write range of the tag/reader combination is typically somewhat less (~10–15% less) than the read range "d" and, thus, this should also be taken into account in determining optimal placement and positioning of each reader device 500.

Typical RFID data communication is asynchronous or unsynchronized in nature and, thus, particular attention should be given in considering the form in which the data is to be communicated. Structuring the bit stream to accommodate these needs, such as via a channel encoding scheme, is preferred in order to provide reliable system performance. Various suitable channel encoding schemes, such as amplitude shift keying (ASK), frequency shift keying (FSK), phase shift keying (PSK) and spread spectrum modulation (SSM), are well know to those skilled in the art and will not be further discussed herein. The choice of carrier wave frequency is also important in determining data transfer rates. Generally speaking the higher the frequency the higher the data transfer or throughput rates that can be achieved. This is intimately linked to bandwidth or range available within the frequency spectrum for the communication process. Preferably, the channel bandwidth is selected to be at least twice the bit rate required for the particular game application.

Figure 7:
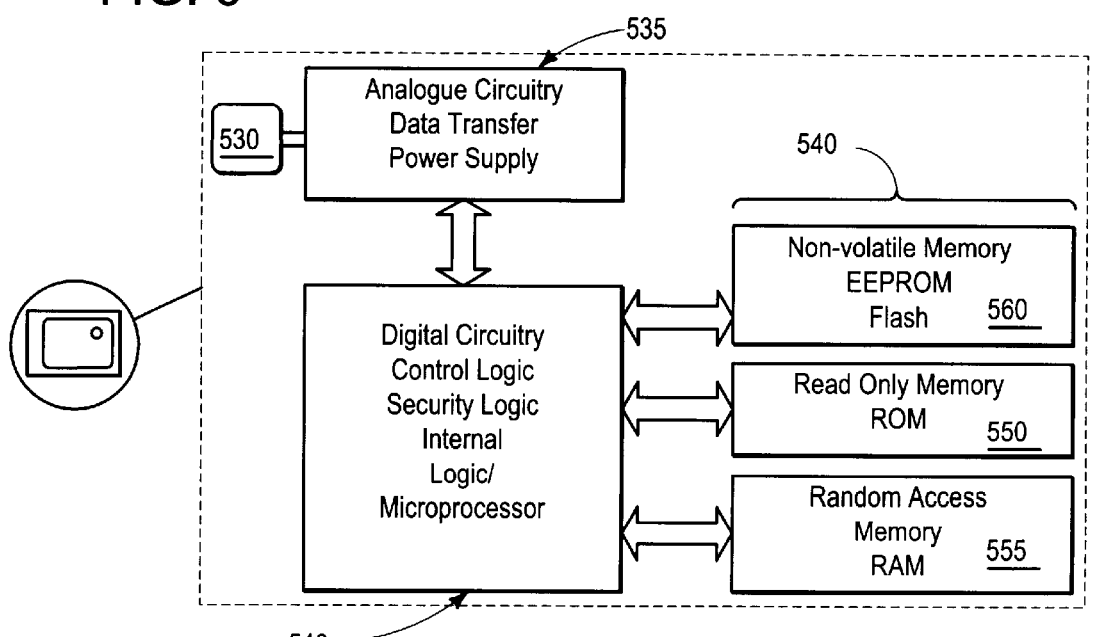
FIG. 7 is a simplified block diagram illustrating the basic organization and function of the electronic circuitry comprising the RFID tag device of FIG. 4B.

FIG. 7 is a simplified block diagram illustrating the basic organization and function of the electronic circuitry comprising the radio frequency transmitter chip 460 of the RFID tag device 420 of FIG. 4B. The chip 460 basically comprises a central processor 530, Analogue Circuitry 535, Digital Circuitry 540 and on-board memory 545. On-board memory 545 is divided into read-only memory (ROM) 550, random access memory (RAM) 555 and non-volatile programmable memory 560, which is available for data storage. The ROM-based memory 550 is used to accommodate security data and the tag operating system instructions which, in conjunction with the processor 530 and processing logic deals with the internal "house-keeping" functions such as response delay timing, data flow control and power supply switching. The RAM-based memory 555 is used to facilitate temporary data storage during transponder interrogation and response. The non-volatile programmable memory 560 may take various forms, electrically erasable programmable read only memory (EEPROM) being typical. It is used to store the transponder data and is preferably non-volatile to ensure that the data is retained when the device is in its quiescent or power-saving "sleep" state.

Various data buffers or further memory components (not shown), may be provided to temporarily hold incoming data following demodulation and outgoing data for modulation and interface with the transponder antenna 450. Analog Circuitry 535 provides the facility to direct and accommodate the interrogation field energy for powering purposes in passive transponders and triggering of the transponder response. Analog Circuitry also provides the facility to accept the programming or "write" data modulated signal and to perform the necessary demodulation and data transfer processes. Digital Circuitry 540 provides certain control logic, security logic and internal microprocessor logic required to operate central processor 530.

Role Play Character Cards

The RFID card 400 illustrated and described above is used, in accordance with the afore-mentioned preferred embodiment, to identify and track individual play participants and/or groups of play participants within a play facility. However, in another preferred embodiment, the same card 400 and/or a similarly configured RFID or a magnetic "swipe" card or the like may be used to store certain powers or abilities of an imaginary role-play character that the card 400 represents. For example, card 400 may represent the Harry Potter character. As each play participant uses his or her favorite character card in various Harry Potter play facilities the Harry Potter character represented by the card 400 gains (or loses) certain attributes, such as magic skill level, magic strength, flight ability, various spell-casting abilities, etc. All of this information is preferably stored on the card 400 so that the character attributes may be easily and conveniently transported to other similarly-equipped play facilities, computer games, video games, home game consoles, hand-held game units, and the like. In this manner, an imaginary role-play character is created and stored on a card that is able to seamlessly transcend from one play medium to the next.

For example, character attributes developed during a play a participant's visit to a local Harry Potter/Hogwart magic facility are stored on the card 400. When the play participant then revisits the same or another Harry Potter play facility, all of the attributes of his character are "remembered" on the card so that the play participant is able to continue playing with and developing the same role-play character. Similarly, various video games, home game consoles, and/or hand-held game units can be and preferably are configured to communicate with the card 400 in a similar manner as described above and/or using other well-known information storage and communication techniques. In this manner, a play participant can use the character card 400 and the role play character he or she has developed with specific associated attributes in a favorite video action game, role-play computer game or the like.

FIGS. 8A–8D are front views of various alternative embodiments of possible role-play character cards for use within a Harry Potter/Hogwart interactive play structure such as illustrated in FIG. 1. Role play cards 600 are preferably constructed substantially the same as the card 400 illustrated and described above in connection with FIGS. 4B, 4B, except with different character illustrations and/or graphics. For example, each card 600 may include a different character from a Harry Potter storyline representing a role-play character desired to be imagined by a play participant. The obverse side (not shown) includes an RFID tag, such as illustrated and described above in connection with FIG. 4B. Alternatively, a magnetic "swipe" strip and/or other well-known information storage means may be used with efficacy, so long as it is relatively compact, durable and inexpensive.

The particular size, shape and theme of the cards 600 is relatively unimportant. In the particular embodiment illustrated, the cards 600 are shaped and themed so as to be used as bookmarks for Harry Potter series books. These may be packaged and sold together with each Harry Potter book, or they may be sold separately as novelty items or the like. If desired, a hole or eyelet 610 may be provided at the top of each card 600 so as to facilitate wearing the card 600 as a pendant on a necklace 620 or as key-chain trinket. Smaller, pocket-sized cards and/or other similar RFID or magnetic transponder devices may also be used where convenience and market demand dictates. Such transponder devices are commercially available, such as from Texas Instruments, Inc. (http://www.tiris.com, e.g., Prod. Nos. RI-TRP-W9WK, RI-TRP-R9QL, RI-TRP-WFOB).

Master Control System

Depending upon the degree of game complexity desired and the amount of information sharing required, the transceivers 300 may or may not be connected to a master control system or central server 375 (FIG. 3). If a master system is utilized, preferably each wand 200 and/or RFID card 400, 600 is configured to electronically send and receive information to and from various receivers or transceivers 300 distributed throughout the play facility 100 using a send receive radio frequency ("SRRF") communication protocol. This communications protocol provides the basic foundation for a complex, interactive entertainment system which creates a seemingly magic interactive play experience for play participants who possess and learn to use the magical wand. In its most refined embodiments, a user may electronically send and receive information to and from other wands and/or to and from a master control system located within and/or associated with any of a number of play environments, such as a family entertainment facility, restaurant play structure, television/video/radio programs, computer software program, game console, web site, etc. This newly created network of SRRF-compatible play and entertainment environments provides a complex, interactive play and entertainment system that creates a seamless magical interactive play experience that transcends conventional physical and temporal boundaries.

SRRF may generally be described as an RF-based communications technology and protocol that allows pertinent information and messages to be sent and received to and from two or more SRRF compatible devices or systems. While the specific embodiments described herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog, AM/FM-, laser-, visual-, audio-, and/or ultrasonic-based systems, as desired or expedient.

The SRRF system can preferably send and receive signals (up to 40 feet) between tokens and fixed transceivers. The system is preferably able to associate a token with a particular zone as defined by a token activation area approximately 10–15 feet in diameter. Different transceiver and antenna configurations can be utilized depending on the SRRF requirements for each play station. The SRRF facility tokens and transceivers are networked throughout the facility. These devices can be hidden in or integrated into the facility's infrastructure, such as walls, floors, ceilings and play station equipment. Therefore, the size and packaging of these transceivers is not particularly critical.

In a preferred embodiment, an entire entertainment facility may be configured with SRRF technology to provide a master control system for an interactive entertainment play environment using SRRF-compatible magic wands and/or tracking devices. A typical entertainment facility provided with SRRF technology may allow 300–400 or more users to more-or-less simultaneously send and receive electronic transmissions to and from the master control system using a magic wand or other SRRF-compatible tracking device.

In particular, the SRRF system uses a software program and data-base that can track the locations and activities of up to a hundred more users. This information is then used to adjust the play experience for the user based on "knowing" where the user/player has been, what objectives that player has accomplished and how many points or levels have been reached. The system can then send messages to the user throughout the play experience. For example, the system can allow or deny access to a user into a new play area based on how many points or levels reached by that user and/or based on what objectives that user has accomplished or helped accomplish. It can also indicate, via sending a message to the user the amount of points or specific play objectives necessary to complete a "mission" or enter the next level of play. The master control system can also send messages to the user from other users.

The system is preferably sophisticated enough that it can allow multiple users to interact with each other adjusting the game instantly. The master system can also preferably interface with digital imaging and/or video capture so that the users activities can be visually tracked. Any user can locate another user either through the video capturing system or by sending a message to another device. At the end of a visit, users are informed of their activities and the system interfaces with printout capabilities. The SRRF system is preferably capable of sending and receiving signals up to 100 feet. Transmitter devices can also be hidden in walls or other structures in order to provide additional interactivity and excitement for play participants.

Suitable embodiments of the SRRF technology described above may be obtained from a number of suitable sources, such as AXCESS, Inc. and, in particular, the AXCESS active RFID network system for asset and people tacking applications. In another preferred embodiment the system comprises a network of transceivers 300 installed at specific points throughout a facility. Players are outfitted or provided with a reusable "token"—a standard AXCESS personnel tag clipped to their clothing in the upper chest area. As each player enters a specific interactive play area or "game zone" within the facility, the player's token receives a low frequency activation signal containing a zone identification number (ZID). The token then responds to this signal by transmitting both its unique token identification number (TID) along with the ZID, thus identifying and associating the player with a particular zone.

The token's transmitted signal is received by a transceiver 300 attached to a data network built into the facility. Using the data network, the transceiver forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time. In this manner the SRRF technology allows the master control system to uniquely identify and track people as they interact with various games and activities in a semi-controlled play environment. Optionally, the system may be configured for two-way messaging to enable more complex interactive gaming concepts.

In another embodiment, the SRRF technology can be used in the home. For enabling Magic at the home, a small SRRF module is preferably incorporated into one or more portable toys or objects that may be as small as a beeper. The SRRF module supports two-way communications with a small home transceiver, as well as with other SRRF objects. For example, a Magic wand 200 can communicate with another Magic wand 200.

The toy or object may also include the ability to produce light, vibration or other sound effects based on signals received through the SRRF module. In a more advanced implementation, the magical object may be configured such that it is able to display preprogrammed messages of up to 50 characters on a LCD screen when triggered by user action (e.g. button) or via signals received through the SRRF module. This device is also preferably capable of displaying short text messages transmitted over the SRRF wireless link from another SRRF-compatible device.

Preferably, the SRRF transceiver 300 is capable of supporting medium-to-long range (10–40 feet) two-way communications between SRRF objects and a host system, such as a PC running SRRF-compatible software. This transceiver 300 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other programs media, stripped out and re-transmitted using low cost components. The exact method for transposing these signals, as well as the explicit interface between the home transceiver and common consumer electronics (i.e. TVs, radios, VCRs, DVD players, A/V receivers, etc.) is not particularly important, so long as the basic functionality as described above is achieved. The various components needed to assemble such an SRRF system suitable for use with the present invention are commercially available and their assembly to achieve the desired functionality described above can be readily determined by persons of ordinary skill in the art. If desired, each SRRF transceiver may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or user replaceable battery may also be used to power both the SRRF module and associated toy electronics.

Interactive Game Play

The present invention may be carried out using a wide variety of suitable game play environments, storylines and characters, as will be readily apparent to those skilled in the art. The following specific game play examples are provided for purposes of illustration and for better understanding of the invention and should not be taken as limiting the invention in any way:

EXAMPLE 1

An overall interactive gaming experience and entertainment system is provided (called the "Magic" experience), which tells a fantastic story that engages children and families in a never-ending adventure based on a mysterious treasure box filled with magical objects. Through a number of entertainment venues such as entertainment facilities, computer games, television, publications, web sites, and the like, children learn about and/or are trained to use these magical objects to become powerful "wizards" within one or more defined "Magic" play environments. The play environments may be physically represented, such as via an actual existing play structure or family entertainment center, and/or it may be visually/aurally represented via computer animation, television radio and/or other entertainment venue or source.

The magical objects use the SRRF communications system allowing for messages and information to be received and sent to and from any other object or system. Optionally, these may be programmed and linked to the master SRRF system. Most preferably, the "magic wand" 200 is configured to receive messages from any computer software, game console, web site, and entertainment facility, television program that carries the SRRF system. In addition, the magic wand can also preferably send messages to any SRRF compatible system thus allowing for the "wand" to be tracked and used within each play environment where the wand is presented. The toy or wand 200 also preferably enables the user to interact with either a Master system located within a Magic entertainment facility and/or a home-based system using common consumer electronic devices such as a personal computer, VCR or video game system.

The master control system for a Magic entertainment facility generally comprises: (1) a "Icken" (gag, toy, wand 200 or other device) carried by the user 105, (2) a plurality of receivers or transceivers 300 installed throughout the facility, (3) a standard LAN communications system (optional), and (4) a master computer system interfaced to the transceiver network (optional). If a Master computer system is used, preferably the software program running on the Master computer is capable of tracking the total experience for hundreds of users substantially in real time. The information is used to adjust the play for each user based on knowing the age of the user, where the user has played or is playing, points accumulated, levels reached and specific objectives accomplished. Based on real-time information obtained from the network, the system can also send messages to the user as they interact throughout the Magic experience.

The Master system can quickly authorize user access to a new play station area or "zone" based on points or levels reached. It can also preferably indicate, via sending a message to the user, the points needed or play activities necessary to complete a "mission." The Master system can also send messages to the user from other users. The system is preferably sophisticated enough to allow multiple users to interact with each other while enjoying the game in real-time.

Optionally, the Master system can interface with digital imaging and video capture so that the users' activities can be visually tracked. Any user can then locate another user either through the video capturing system or by sending a message to another device. At the end of a visit, users are informed of their activities and other attributes related to the Magic experience via display or printout.

For relatively simple interactive games, the Master system may be omitted in order to save costs. In that case, any game-related information required to be shared with other receivers or transceivers may be communicated via an RS-232 hub network, Ethernet, or wireless network, or such information may be stored on the want itself and/or an associated RFID card or badge carried by the play participant (discussed later). For retrofit applications, it is strongly preferred to provide substantially all stand-alone receivers or transceivers that do not communicate to a master system or network. This is to avoid the expense of re-wiring existing infrastructure. For these applications, any information required to be shared by the game system is preferably stored on the wand or other RFID device(s) carried by the play participants. Alternatively, if a more complex game experience is demanded, any number of commercially available wireless networks may be provided without requiring rewiring or existing infrastructure.

EXAMPLE 2

Figure 9A:
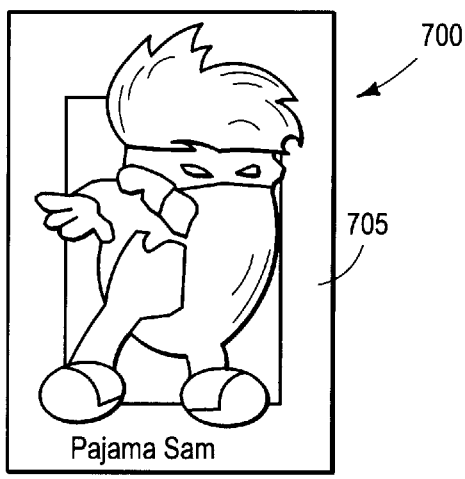
FIGS. 9A and 9B are front and rear views, respectively, of an alternative embodiment of a role-play character card for use with a specially configured interactive game and/or game play facility having features and advantages in accordance with the present invention.
Figure 9B:
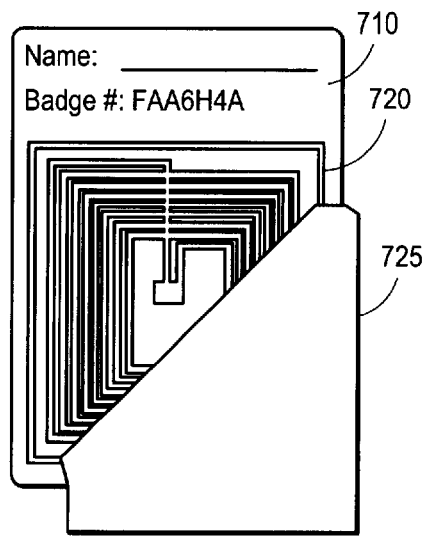

A computer adventure game is provided in which one or more play participants assume the role of an imaginary character "Pajama Sam" from the popular series of computer games published by Humongous Entertainment, Inc. of Woodinville, Wash. A Pajama Sam adventure character card 700, such as illustrated in FIGS. 9A, 9B, is provided to each play participant. The card may be packaged and sold together with the game software, and/or it may be sold separately, as convenience and market demands dictate.

The card 700 may be constructed substantially the same as the cards 400, 600 illustrated and described above in connection with FIGS. 4 and 8, except with different character illustrations and/or graphics. For example, each card 700 may include a different character from the Pajama Sam computer game series representing a role-play character desired to be imagined by a play participant. The obverse side (FIG. 9B) includes an RFID tag 720, such as illustrated and described above in connection with FIG. 4B. Preferably, the tag 720 is covered with an adhesive paper label 725. Alternatively, the tag 720 may be molded directly into a plastic sheet substrate from which the card 700 is then formed. Alternatively, a magnetic "swipe" strip and/or other well-known information storage means may be used with efficacy, so long as it is relatively compact, durable and inexpensive.

The particular size, shape and theme of the card 700 is relatively unimportant. In the particular embodiment illustrated, the card 700 is shaped and themed similar to a baseball trading card so that they may be collected and stored conveniently in any baseball card album or the like. If desired, a hole or eyelet (not shown) may be provided at the top of the card 700 so as to facilitate wearing the card 700 as a pendant on a necklace or as key-chain trinket. Of course, smaller, pocket-sized cards and/or other similar RFID or magnetic transponder devices may also be used where convenience and market demand dictates. Such alternative suitable transponder devices are commercially available, such as from Texas Instruments, Inc. (http://www.tiris.com, e.g., Prod. Nos. RI-TRP-W9WK, RI-TRP-R9QL, RI-TRP-WFOB).

A specially configured computer, video game, home game console, hand-held gaming device or similar gaming device is provided with a reader, and more preferably a reader/writer such as described above, that is able to communicate with the tag 720 or other information storage means associated with the card 700. As each play participant plays his or her favorite Pajama Sam game the Pajama Sam character represented by the card 700 gains (or loses) certain attributes, such as speed, dexterity, and/or the possession of certain tools or objects associated with the game play. All of this information is preferably stored on the card 700 so that the character attributes may be easily and conveniently transported to other similarly-equipped computer games, video games, home game consoles, hand-held game units, play facilities, and the like. In this manner, an imaginary role-play character is created and stored on a card that is able to seamlessly transcend from one play medium to the next.

Figure 10A:
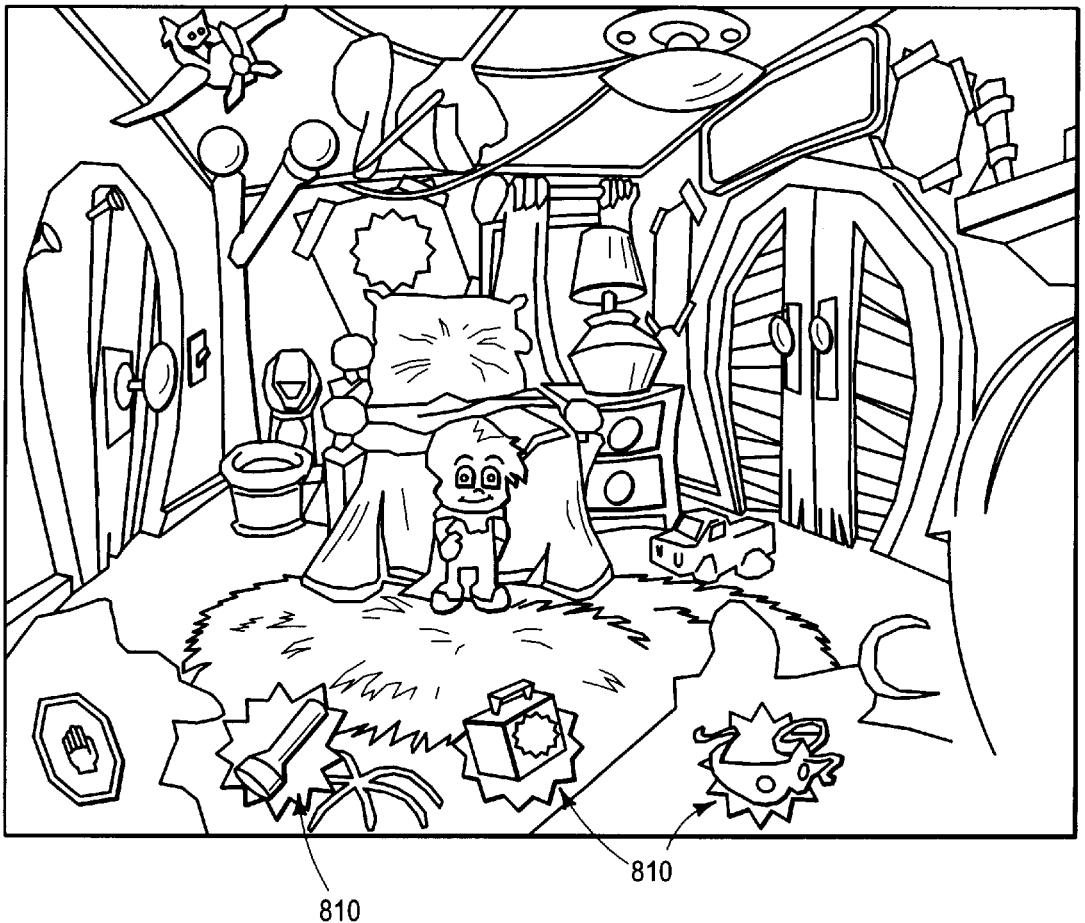
FIGS. 10A–G are various illustrations of a role-play adventure game configured to be utilized with the role-play character card of FIG. 9 and having features and advantages in accordance with the present invention.

For example, in the course of playing a typical Pajama Sam game, players must "find" certain objects or tools that they will use to solve certain puzzles or tasks presented by the game. Players "pick up" these objects or tools by clicking their mouse on the desired object. The computer game software then keeps a record of which objects have been collected and displays those objects on the computer screen when requested by the player. This is illustrated by FIG. 10A, which is a screen shot from the computer game, "Pajama Sam, in No Need to Hide When It's Dark Outside," published by Humongous Entertainment., Inc. © 1996. The game begins in Pajama Sam's bedroom, and the player is asked to find and click on certain objects 810 that Pajama Sam needs to begin his adventure—namely his flashlight, PajamaMan lunch box and PajamaMan mask. As these objects are located and collected, they are displayed on the bottom of the computer screen, as illustrated in FIG. 10A.

Figure 10B:
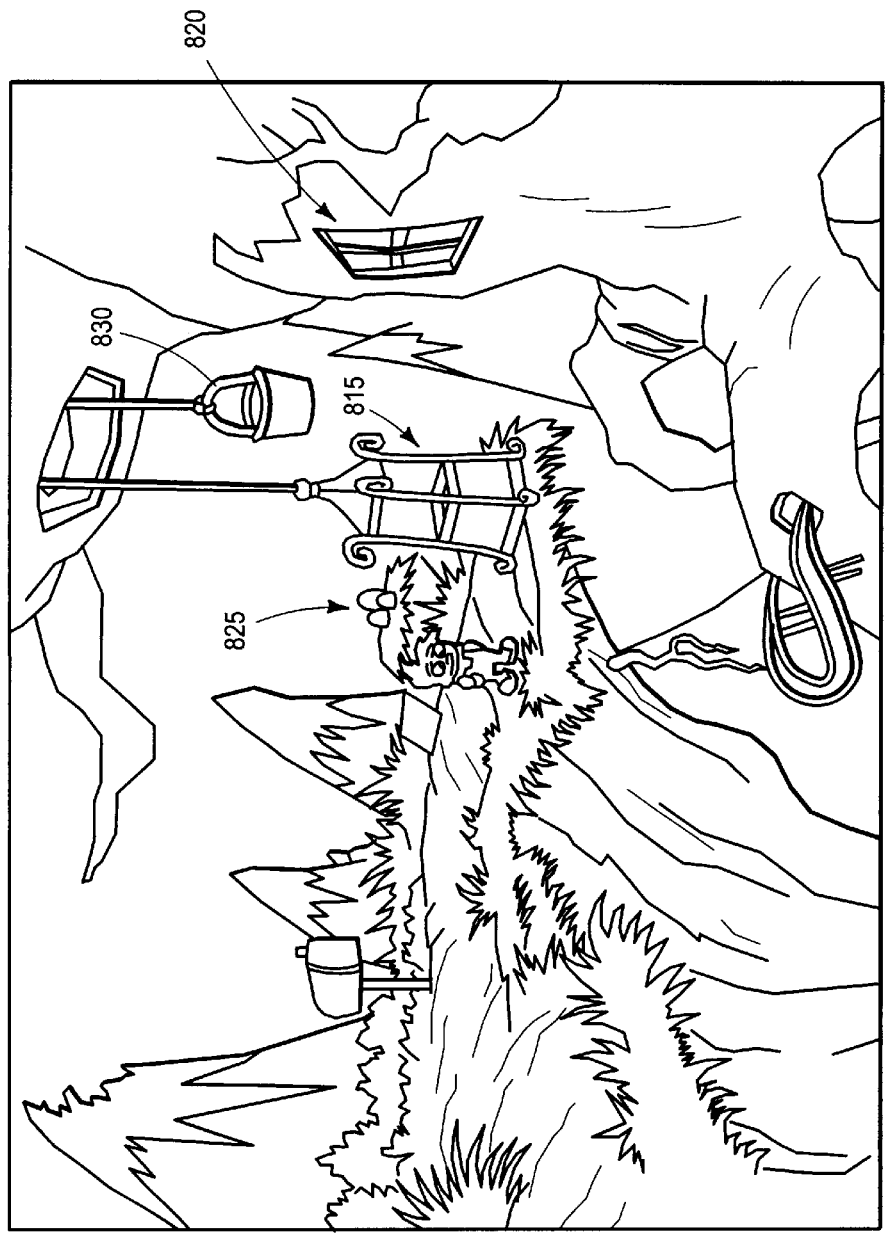
Figure 10C:
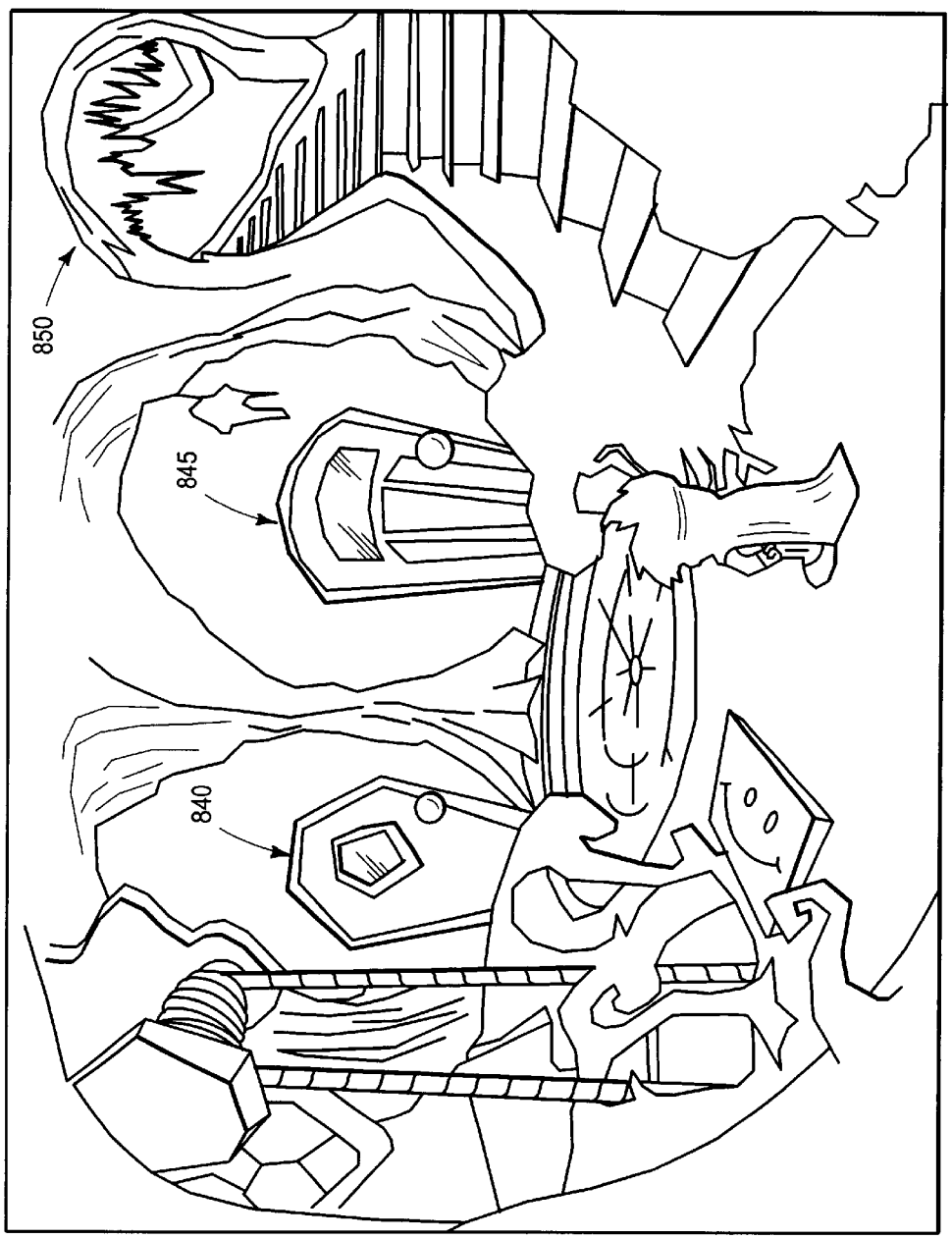
Figure 10D:
Figure 10E:
Figure 10F:
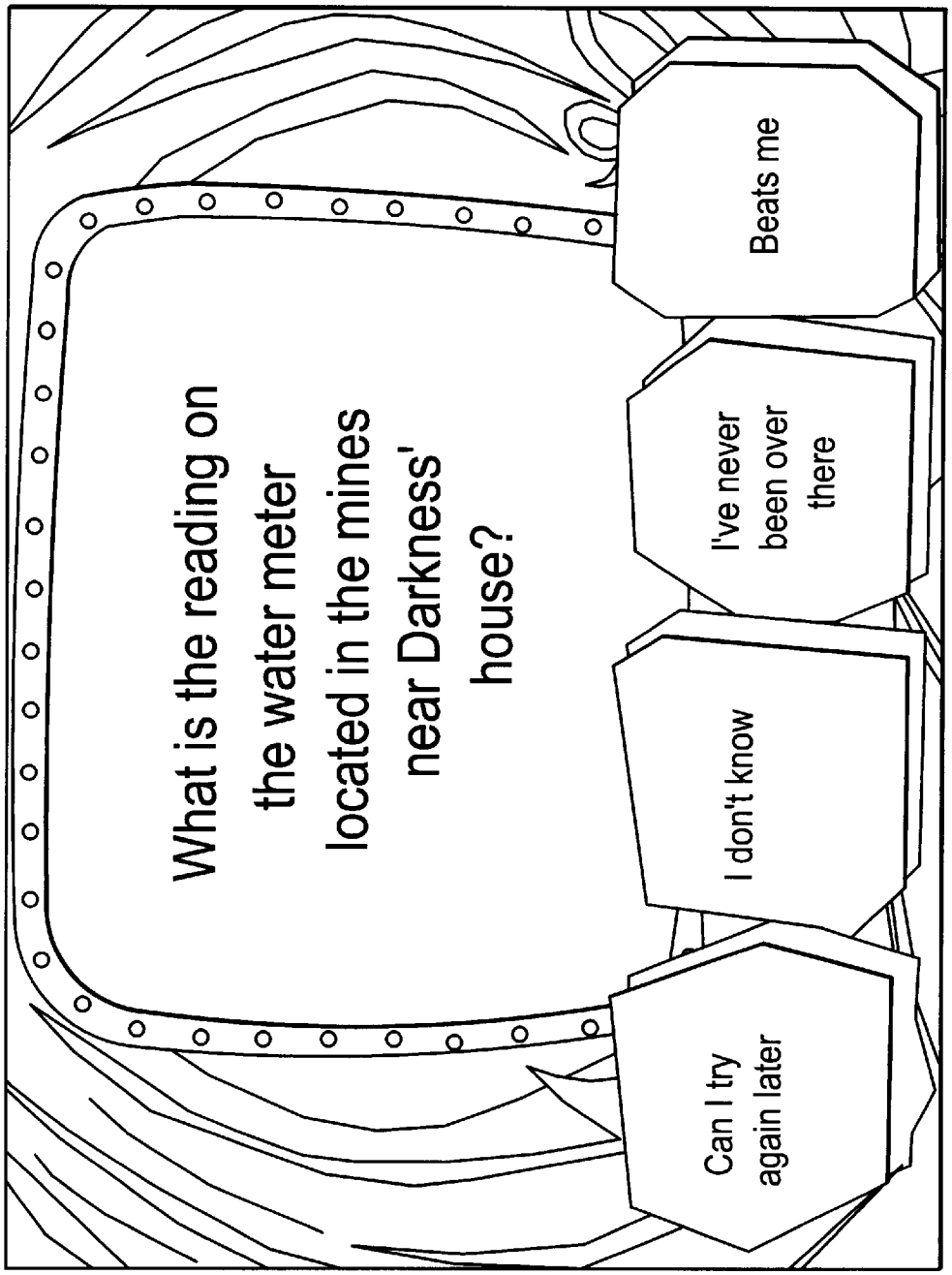
Figure 10G:
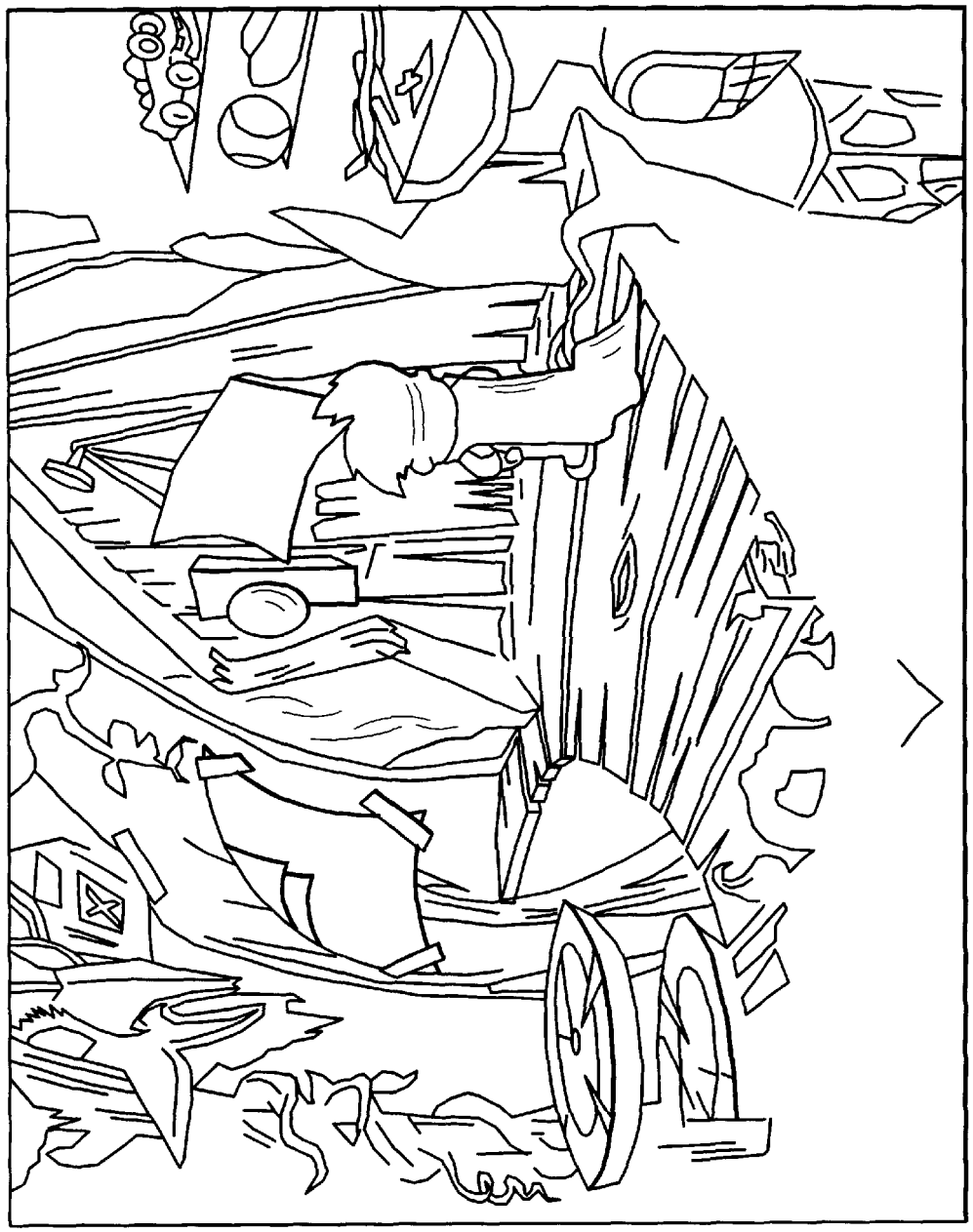

FIG. 10B is a screen shot from the same game where the player faces his first challenge or puzzle to solve. He or she must somehow make Pajama Sam operate the elevator 815 to take Pajama Sam up into the tree house 820 where his archenemy "Darkness" resides. To solve the puzzle the player explores the scene with his mouse and clicks on objects that might be useful to solve the puzzle. Eventually, the player will discover a pile of rocks 825 which Pajama Sam picks up and tosses into the basket 830 to operate the elevator. In the next scene (FIG. 10C) Pajama Sam is inside the tree house and the player must decide which of three possible paths to take representing doors 840, 845 and 850. Doorway 850 leads to the scene illustrated in FIG. 10D in which Pajama Sam (and the player) is challenged to a trivia game by a pair of talking doors. The player chooses from different categories of questions and attempts to choose correct answers from a multiple choice list provided by the game (see FIG. 10E). Ultimately, the player is challenged with a question specific to the game (see FIG. 10F) and which requires the player to have visited a particular location within the game where the information is contained. If the player has not completed that portion of the computer game, he or she cannot answer the question posed and Pajama Sam cannot advance in the adventure game (see FIG. 10G).

If the player were to quit the game at this point, he or she could save the game on the host computer and return to the same computer later to complete the adventure. But the Pajama Sam character itself, its attributes, experiences and accomplishments are not portable and cannot presently be transferred from one game or gaming environment to another. However, the Pajama Sam adventure card 700 in accordance with the present invention enables a play participant to continue the adventure somewhere else (e.g. at a friends house, or a video arcade facility) without having to restart the game and repeat the steps that the player has already accomplished. With the Pajama Sam adventure card 700, relevant details of the game experience and the Pajama Sam character are stored on the card 700 so that the player can take the card to another computer, game console, hand-held game device or a designated Pajama Sam play facility, to continue the adventure in a new and exciting play environment.

For example, the Pajama Sam play facility could be configured as a physical play space similar to that described above in connection with FIG. 1, except having theming and game play that parallels that of one or more of the Pajama Same computer adventure games. Now our computer game player who has a Pajama Same adventure card 700 can visit this play facility and the facility would be able to read the information on the card and determine that this particular player has already completed the first puzzle in the first Pajama Sam computer adventure game. If the player desires, he or she will be allowed to advance automatically in the game play within the Pajama Sam play facility so that the player can work on a new puzzle. If the player successfully solves a new puzzle at the play facility, this information will be recorded on the Pajama Sam adventure card 700. The next time he or she plays the computer game the card can be automatically read and the computer experience can be modified or updated in accordance with the new information recorded on the card. In this manner, the character role-play experience becomes portable, personal and long-term. This, in turn, facilitates the development of even more sophisticated and complex role-play characters and longer, more enjoyable role play experiences as players are able to continue playing with and developing the same role-play character(s) over long periods of time and in different and varied play environments.

Similarly, various other video games, home game consoles, and/or hand-held game units can be and preferably are configured to communicate with the Pajama Sam adventure card 700 in a similar manner as described above and/or using other well-known information storage and communication techniques. In this manner, a play participant can use the Pajama Sam adventure card 700 and the role play character he or she has developed with specific associated attributes in a favorite video action game, role-play computer game, internet adventure game or the like.

EXAMPLE 3

A trading card game is provided wherein a plurality of cards depicting various real or imaginary persons, characters and/or objects are provided and wherein each card has recorded or stored thereon in an electronically readable format certain selected information pertaining to the particular person, character or object, such as performance statistics, traits/powers, or special abilities. The information is preferably stored on an RFID tracking tag associated with each card and which can be read electronically and wirelessly over a predetermined range preferably greater than about 1 cm when placed in the proximity of a suitably configured RF reader. Optionally, the RFID tag may be read/write capable such that it the information stored thereon may be changed or updated in any manner desired. Alternatively, a magnetic strip, bar code or similar information storage means may be used to store relevant information on the card.

Figure 11A:
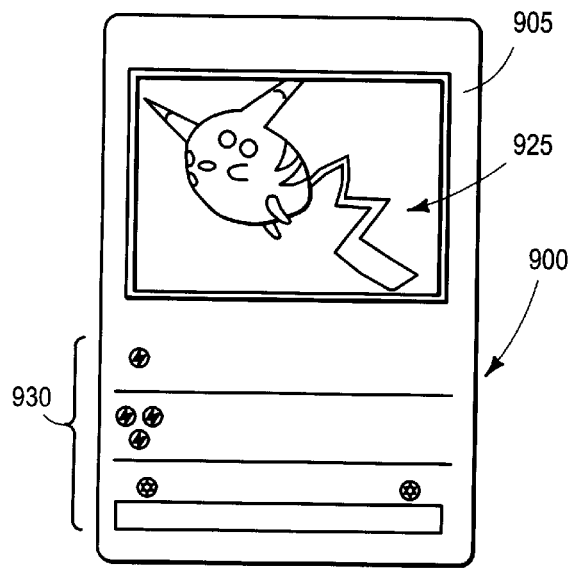
FIGS. 11A and 11B are front and rear views, respectively, of a trading or playing card having features and advantages in accordance with the present invention.
Figure 11B:
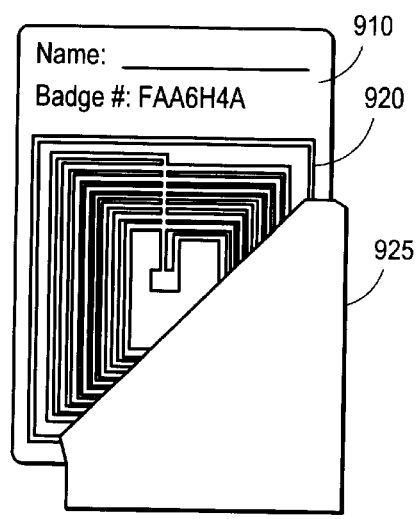
Figure 11C:
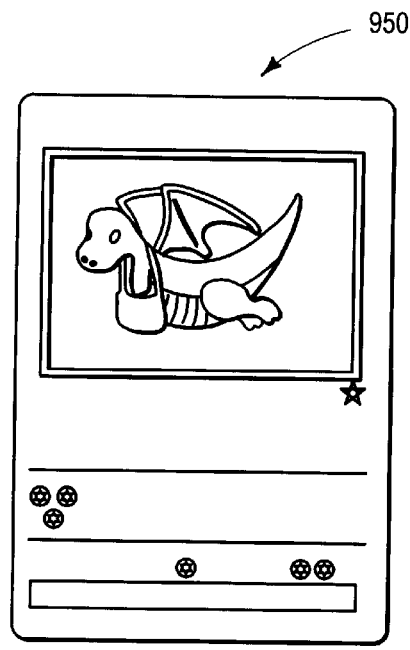
FIGS. 11C and 11D are front views of several alternative embodiments of trading or playing cards having features and advantages in accordance with the present invention.
Figure 11D:
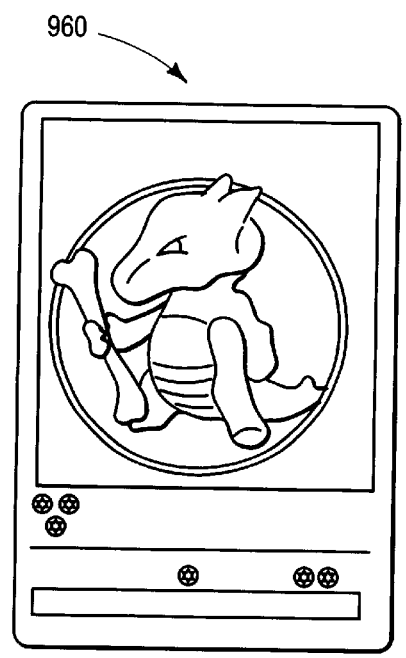

FIGS. 11A and 11B depict one preferred embodiment of a trading card 900 having features and advantages in accordance with the present invention. The particular trading card illustrated in FIG. 11A is provided in the theme of the popular Pokeman characters and, in particular, the character Pikachu. FIGS. 11C and 11D illustrate several other possible Pokeman themed trading cards which may be provided in accordance with the present invention. Each card preferably comprises a paper, cardboard or plastic substrate having a front side 905 and a back side 910. The front 905 of the card 900 may be imprinted with graphics, photos, or any other information as desired. In the particular embodiment illustrated, the front 905 contains an image of the Pikachu character 925 in keeping with the Pokeman theme. In addition, the front 905 of the card 900 may include any number of other designs or information 930 pertinent to its application. For example, the character's type, size and evolution may be indicated, along with any special powers or traits the character may possess.

The obverse side 910 of the card 900 preferably contains the card electronics comprising a radio frequency tag 920 pre-programmed with the pertinent information for the particular person, character or object portrayed on the front of the card. The tag 920 generally comprises a spiral wound antenna 950, a radio frequency transmitter chip 960 and various electrical leads and terminals 970 connecting the chip 960 to the antenna. If desired, the tag 920 may be covered with an adhesive paper label (not shown) or, alternatively, the tag may be molded directly into a plastic sheet substrate from which the card 900 is formed.

Preferably, the tag 920 is passive (requires no batteries) so that it is inexpensive to purchase and maintain. Such tags and various associated readers and other accessories are commercially available in a wide variety of configurations, sizes and read ranges. RFID tags having a read range of between about 10 cm to about 100 cm are particularly preferred, although shorter or longer read ranges may also be acceptable. The particular tag illustrated is the 13.56 mHz tag sold under the brand name Taggit™ available from Texas Instruments, Inc. (http://www.tiris.com, Product No. RI-103–110A). The tag 920 has a useful read/write range of about 25 cm and contains 256-bits of on-board memory arranged in 8×32-bit blocks which may be programmed (written) and read by a suitably configured read/write device. If a longer read/write range and/or more memory is desired, optional battery-powered tags may be used instead, such as available from ACXESS, Inc. and/or various other vendors known to those skilled in the art.

Cards 900 may be collected or traded and/or they may be used to play various games, such as a Pokeman arena competition using an electronic interface capable of reading the card information. Such games may be carried out using a specially configured gaming device or, alternatively, using a conventional computer gaming platform, home game console, arcade game console, hand-held game device, internet gaming device or other gaming device that has been modified to include an RF reader or magnetic "swipe" reader device as illustrated and described above. Advantageously, play participants can use the trading cards 900 to transport a information pertinent to a particular depicted person, character or object to a favorite computer action game, adventure game, interactive play structure or the like. For example, a suitably configured video game console and video game may be provided which reads the card information and recreates the appearance and/or traits of particular depicted person, character of object within the game. If desired, the game console may further be configured to write information to the card in order to change or update certain characteristics or traits of the character, person or object depicted by the card 900 in accordance with a predetermined game play progression.

Of course, those skilled in the art will readily appreciate that the underlying concept of an RIFD trading card 900 and card game is not limited to cards depicting fantasy characters or objects, but may be implemented in a wide variety of alternative embodiments, including sporting cards, baseball, football and hockey cards, movie character cards, dinosaur cards, educational cards and the like. If desired, any number of other suitable collectible/tradable tokens or trinkets may also be provided with a similar RFID tag device in accordance with the teachings of the present invention as dictated by consumer tastes and market demand.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. An interactive game for amusing and entertaining one or more game participants, comprising:
   one or more transponder devices for facilitating storage and retrieval of selected information pertaining to individual game participants and/or groups of game participants playing the game, said transponder devices being sized and adapted to be worn and/or otherwise transported by each game participant and/or group of game participants while playing said game;
   one or more reader devices adapted to retrieve said stored information from each said transponder device;
   one or more writer devices adapted to selectively update and/or modify said stored information on each said transponder device in accordance with the completion by game participants and/or groups of game participants of one or more defined gaming sequences or protocols;
   at least one interactive gaming effect adapted to communicate with one or more of said reader devices and to produce a first result if a first set of conditions represented by said stored information is satisfied and to produce a second result if a second set of conditions represented by said stored information is satisfied;
   at least one of said transponder devices being operatively associated with a wireless wand actuator device configured and adapted to enable a game participant to electronically and wirelessly actuate at least one or more of said interactive gaming effects by touching, shaking, twisting and/or pointing the wand in a predetermined manner to create a seemingly magical play experience;
   whereby game participants and/or groups of game participants are encouraged to complete said defined gaming sequences or protocols in order to produce the necessary stored information to satisfy either said first or second set of conditions and thereby produce either said first or second result as desired.

2. The interactive game of claim 1 wherein at least one of said transponder devices comprises a radio-frequency transmitter.

3. The interactive game of claim 2 wherein said at least one transponder device comprises an RFID tag.

4. The interactive game of claim 3 wherein said RFID tag is configured to operate at one or more of the following frequencies: 134.2 kHz, 123.2 kHz or 13.56 mHz.

5. The interactive game of claim 3 wherein said RFID tag comprises a 13.56 mHz read/write label tag.

6. The interactive game of claim 3 wherein said RFID tag comprises a 134.2 kHz and/or 123.2 kHz, 23 mm glass transponder.

7. The interactive game of claim 2 wherein said at least one transponder device is configured and adapted to use a send/receive radio frequency communication protocol.

8. The interactive game of claim 1 wherein at least one of said transponder devices comprises an infrared LED transmitter.

9. The interactive game of claim 1 wherein said one or more transponder devices are adapted to utilize one or more wireless communication protocols selected from the group consisting of infrared-, digital-, analog, magnetic, AM/FM-, laser-, visual-, audio-, and/or ultrasonic.

10. The interactive game of claim 1 wherein said one or more transponder devices are embodied in a portable structure comprising one or more of the following: identification badge, trading card, collectible sports card, role-play character card, book mark, necklace, pendant, key-chain, trinket, token and/or wand.

11. The interactive game of claim 1 wherein each said transponder device is adapted to store certain information uniquely identifying one or more game participants and/or group of game participants.

12. The interactive game of claim 11 wherein said stored information includes one or more unique identification numbers.

13. The interactive game of claim 11 wherein said stored information includes one or more of the following: name, age, address, phone number, fax number, internet address, e-mail address.

14. The interactive game of claim 1 wherein each said transponder device is adapted to store information representing points scored and/or levels achieved by each game participant and/or group of game participants.

15. The interactive game of claim 1 wherein said one or more reader devices and/or said writer devices are configured to operate at one or more of the following frequencies: 134.2 kHz, 123.2 kHz or 13.56 mHz.

16. The interactive game of claim 1 wherein at least one of said one or more reader devices and said one or more writer devices comprise a single integral reader/writer device.

17. The interactive game of claim 1 wherein said defined gaming sequence comprises one or more of the following elements: role playing, reading, memory stimulation, tactile coordination.

18. The interactive game of claim 1 wherein said defined gaming sequence requires a group of game participants to work together.

19. The interactive game of claim 1 wherein said interactive gaming effect comprises awarding a game participant with additional gaming points, game levels and/or rank.

20. The interactive game of claim 1 wherein said game comprises a role play game using an imaginary game character and wherein said interactive gaming effect comprises awarding certain enhanced attributes to said game character.

21. The interactive game of claim 20 wherein said enhanced attributes comprise one or more of the following: magic skill level, magic strength, flight ability, spell-casting abilities.

22. The interactive game of claim 1 wherein said game comprises a role-play fantasy character game and wherein said one or more transponder devices comprise electronically readable role-play cards comprising a paper, cardboard or plastic substrate having a front side and a back side, the front side being imprinted with graphics, photos, or other information representative of a desired role-play character, the back side having affixed thereon an RF tag programmable to contain certain character attributes and whereby the stored character attributes may be easily and conveniently transported to RF-equipped play facilities, computer games, video games, home game consoles, and/or hand-held game units.

23. The interactive game of claim 1 wherein said game comprises a collectible trading card game and wherein said one or more transponder devices comprise electronically readable trading cards depicting various real or imaginary persons, characters and/or objects and wherein each card has recorded or stored thereon in an electronically readable format certain selected information pertaining to the particular person, character or object, such as performance statistics, traits/powers, or special abilities, the information being stored on an RFID tracking tag associated with each card and which can be read electronically and wirelessly over a predetermined range greater than about 1 cm when placed in the proximity of one or more of said reader devices.

24. The interactive game of claim 1 wherein said interactive gaming effect comprises an access control device and wherein said first result comprises allowing access by one or more game participants to a particular defined play station area or zone and wherein said second result comprises denying access by one or more game participants to said defined play station area or zone.

25. The interactive game of claim 24 wherein said defined play station area or zone comprises one or more of the following: play area within a play structure, game level within a computer gaming platform, home game console, arcade game console, video game, hand-held game device, or internet gaming device.

26. The interactive game of claim 1 wherein said interactive gaming effect comprises selectively actuating one or more of the following: projectile accelerators, cannons, interactive targets, fountains, geysers, cranes, filter relays, lighting, sound, mechanical actuators, or pneumatic actuators.

27. The interactive game of claim 1 wherein said reader devices and said writer devices are distributed throughout a gaming facility and wherein said game is carried out within said facility.

28. The interactive game of claim 27 wherein said gaming facility comprises an amusement park, family entertainment center, restaurant, arcade or amusement center.

29. The interactive game of claim 1 wherein said reader devices and said writer devices are operatively associated with one or more of the following: entertainment center, television, video, radio, computer software program, game console, or web site.

30. The interactive game of claim 29 further comprising a wireless actuator device or wand configured and adapted to enable a game participant to electronically and wirelessly actuate one or more of said interactive gaming effects to create a seemingly magical play experience.

31. An interactive game for amusing and entertaining one or more game participants, comprising:
one or more transponder devices for facilitating storage and retrieval of selected information pertaining to individual game participants and/or groups of game participants playing the game, said transponder devices being sized and adapted to be worn and/or otherwise transported by each game participant and/or group of game participants while playing said game;
one or more reader devices adapted to retrieve said stored information from each said transponder device;
one or more writer devices adapted to selectively update and/or modify said stored information on each said transponder device in accordance with the completion by game participants and/or groups of game participants of one or more defined gaming sequences or protocols, said reader devices and said writer devices being operatively associated with one or more of the following: entertainment center, television, video, radio, computer software program, game console, or web site;
at least one interactive gaming effect adapted to communicate with one or more of said reader devices and to produce a first result if a first set of conditions represented by said stored information is satisfied and to produce a second result if a second set of conditions represented by said stored information is satisfied; and
a wireless actuator device or wand configured and adapted to enable a game participant to electronically and wirelessly actuate one or more of said interactive gaming effects to create a seemingly magical play experience and wherein said wireless actuator device or wand comprises one or more combination wheels having various symbols and/or images thereon which may be rotated to produce a desired pattern of symbols for actuating a particular interactive gaming effect;
whereby game participants and/or groups of game participants are encouraged to complete said defined gaming sequences or protocols in order to produce the necessary stored information to satisfy either said first or second set of conditions and thereby produce either said first or second result as desired.

32. A game for amusing and entertaining one or more game participants within a play facility, comprising:
one or more wand devices for facilitating storage and retrieval of selected information pertaining to individual game participants and/or groups of game participants playing the game, said wand devices being sized and adapted to be transported by each game participant and/or group of game participants while playing said game and being further configured and adapted to produce a desired effect by touching, shaking, twisting and/or pointing the wand in a predetermined manner to create a seemingly magical play experience;
one or more reader devices distributed throughout said play facility and adapted to retrieve said stored information from each said wand device when in proximity thereof;
one or more writer devices adapted to selectively update and/or modify said stored information on each said wand device in accordance with the completion by game participants and/or groups of game participants of one or more defined gaming sequences or protocols;
at least one interactive gaming effect associated with one or more of said reader devices and to produce a first result if a first set of conditions represented by said stored information is satisfied and to produce a second result if a second set of conditions represented by said stored information is satisfied.

33. The game of claim 32 wherein said one or more wand devices comprises a radio-frequency transmitter.

34. The game of claim 32 wherein said one or more wand devices comprises an RFID tag.

35. The game of claim 34 wherein said RFID tag comprises a radio-frequency transceiver configured to operate at one or more of the following frequencies: 134.2 kHz, 123.2 kHz or 13.56 mHz.

36. The game of claim 32 wherein said wand comprises an elongated rod having an RFID tag transponder at the tip thereof which game participants may selectively bring into proximity with one or more of said reader devices to actuate an associated gaming effect.

37. The game of claim 32 wherein said RFID tag comprises 134.2 kHz and/or 123.2 kHz, 23 mm glass transponder.

38. The game of claim 32 wherein said wand device further comprises one or more infrared LED transmitters.

39. The game of claim 32 further comprising one or more transponder devices embodied in a portable structure comprising one or more of the following: identification badge, trading card, collectible sports card, role-play character card, book mark, necklace, pendant, key-chain, trinket, and/or token.

40. The game of claim 32 wherein each wand device is adapted to store certain information uniquely identifying one or more game participants and/or group of game participants.

41. The game of claim 40 wherein said stored information includes one or more unique identification numbers.

42. The game of claim 40 wherein said stored information includes one or more of the following: name, age, address, phone number, fax number, internet address, e-mail address.

43. The game of claim 32 wherein each said wand device is adapted to store information representing points scored and/or levels achieved by each game participant and/or group of game participants.

44. The game of claim 32 wherein said defined gaming sequence comprises one or more of the following elements: role playing, reading, memory stimulation, tactile coordination.

45. The game of claim 32 wherein said defined gaming sequence requires a group of game participants to work together to achieve a common goal.

46. The game of claim 32 wherein said interactive gaming effect comprises rewarding a game participant with additional gaming points, game levels and/or ranks.

47. The game of claim 32 wherein said game comprises a role play game using an imaginary game character and wherein said interactive gaming effect comprises awarding certain enhanced attributes to said game character.

48. The game of claim 47 wherein said enhanced attributes comprise one or more of the following: magic skill level, magic strength, flight ability, spell-casting abilities.

49. The game of claim 32 wherein said game comprises a role-play fantasy character game and wherein said game further comprises one or more electronically readable role-play cards comprising a paper, cardboard or plastic substrate having a front side and a back side, the front side being imprinted with graphics, photos, or other information representative of a desired role-play character, the back side having affixed thereon an RF tag programmable to contain certain character attributes and whereby the stored character attributes may be transported to RF-equipped play facilities, computer games, video games, home game consoles, and/or hand-held game units.

50. The game of claim 32 wherein said game comprises a collectible trading card game and wherein said game further comprises one or more electronically readable trading cards depicting various real or imaginary persons, characters and/or objects and wherein each card has recorded or stored thereon in an electronically readable format certain selected information pertaining to the particular person, character or object, such as performance statistics, traits/powers, or special abilities, the information being stored on an RFID tracking tag associated with each card and which can be read electronically and wirelessly over a predetermined range greater than about 1 cm when placed in the proximity of said one or more of said reader devices.

51. The game of claim 32 wherein said interactive gaming effect comprises an access control device wherein said first result comprises allowing access by one or more game participants to a play station area or zone and wherein said second result comprises denying access by one or more game participants to said defined play station area or zone.

52. The game of claim 32 wherein said interactive gaming effect comprises selectively actuating one or more of the following: projectile accelerators, cannons, interactive targets, fountains, geysers, cranes, filter relays, lighting, sound, mechanical actuators, or pneumatic actuators.

53. The game of claim 32 wherein said gaming facility comprises an amusement park, family entertainment center, restaurant, arcade or amusement center.

54. The game of claim 32 wherein said reader devices and said writer devices are operatively associated with one or more of the following: entertainment center, television, video, radio, computer software program, game console, or web site.

55. A game for amusing and entertaining one or more game participants within a play facility, comprising:
one or more wand devices for facilitating storage and retrieval of selected information pertaining to individual game participants and/or groups of game participants playing the game, said wand devices being sized and adapted to be transported by each game participant and/or group of game participants while playing said game wherein each said wand device further comprises one or more combination wheels having various symbols and/or images thereon which may be rotated by game participants to produce a desired pattern of symbols;
one or more reader devices distributed throughout said play facility and adapted to retrieve said stored information from each said wand device when in proximity thereof;
one or more writer devices adapted to selectively update and/or modify said stored information on each said wand device in accordance with the completion by game participants and/or groups of game participants of one or more defined gaming sequences or protocols;
at least one interactive gaming effect associated with one or more of said reader devices and to produce a first result if a first set of conditions represented by said stored information is satisfied and to produce a second result if a second set of conditions represented by said stored information is satisfied.

56. A fantasy role-play game for amusing and entertaining one or more game participants, comprising:
a themed play facility or play structure comprising multiple play areas, play elements and play effects adapted and configured for carrying out a desired fantasy role-play experience;
one or more wireless wand actuators configured and adapted to wirelessly actuate at least one of said play effects;

one or more role-play fantasy character cards comprising a substrate having a front side and a back side, the front side being imprinted with graphics, photos, and/or other information representative of a desired role-play character, the back side or front side having affixed thereon or embedded therein an electronically-readable information storage device programmable to contain certain stored information pertaining to selected character attributes, game character developments, and/or game participant information;

a plurality of reader devices associated with one or more gaming platforms distributed throughout said play facility or play structure and adapted and configured to retrieve said stored information from each said character card and to communicate said information to said gaming platform;

whereby said gaming platform is thereby able to uniquely modify a selected gaming experience based on the information stored on each said role-play card.

57. The fantasy role-play game of claim 56 further comprising a writer device adapted to selectively update and/or modify said stored information on each said character card in accordance with the completion by game participants and/or groups of game participants of one or more defined gaming sequences or protocols.

58. The fantasy role-play game of claim 57 wherein said defined gaming sequence requires a group of game participants to work together.

59. The fantasy role-play game of claim 56 wherein said information storage device comprises one or more of the following: radio-frequency transmitter, RFID tag, and/or magnetic strip.

60. The fantasy role-play game of claim 56 wherein said information storage device comprises and RFID tag configured to operate at one or more of the following frequencies: 134.2 kHz, 123.2 kHz or 13.56 mHz.

61. The fantasy role-play game of claim 60 wherein said RFID tag comprises a 13.56 mHz read/write label tag.

62. The fantasy role-play game of claim 56 wherein said information storage device has stored thereon information representing points scored and/or levels achieved by each game participant and/or group of game participants.

63. The fantasy role-play game of claim 56 wherein said information storage device has stored thereon information representing certain role-play character attributes comprising one or more of the following: magic skill level, magic strength, flight ability, spell-casting abilities.

64. A method for carrying out a magical fantasy role-play gaming experience comprising the following steps:

providing a themed play facility or play structure comprising multiple play areas and one or more wireless interactive play effects arranged and adapted to enable play participants to carry out a desired fantasy role-play gaming experience;

providing one or more wireless wand actuators configured and adapted to wirelessly actuate at least one of said wireless interactive play effects by moving, touching, shaking, twisting and/or pointing the wand in a predetermined manner; and moving, touching, shaking, twisting and/or pointing the wand in said predetermined manner to actuate said at least one interactive play effect to create a seemingly magical play experience.

65. The method of claim 64 wherein at least one of said wand actuators comprises an elongated rod having an RFID tag transponder at the tip thereof which play participants may selectively bring into proximity with a wireless receiver or reader device.

66. The method of claim 65 comprising the further step of hiding or concealing one or more of said wireless receiver or reader devices within said play facility or play structure in such a manner that they can be discovered by one or more play participants using said wireless wand actuator.

67. The method of claim 64 comprising the further step of storing certain information uniquely identifying one or more play participants and/or group of play participants and/or each said wand actuator.

68. The method of claim 64 comprising the further step of storing information representing points scored and/or levels achieved by each play participant and/or group of game participants.

69. The method of claim 64 comprising the further step of creating or defining information representing an imaginary role play game character and wherein at least one of said interactive play effects comprises awarding certain enhanced attributes or abilities to said game character.

70. The method of claim 69 comprising the further step of storing or recording said information representing an imaginary role play game character on one or more electronically readable role-play cards comprising a paper, cardboard or plastic substrate having a front side and a back side, the front side being imprinted with graphics, photos, or other information representative of a desired role-play character and an RF tag programmable to contain certain character attributes and whereby the stored character attributes may be transported to RF-equipped play facilities, computer games, video games, home game consoles, and/or hand-held game units.

71. The method of claim 64 wherein at least one of said interactive play effects comprises an access control device for allowing or denying access to one or more of said play areas.

72. A method for carrying out a magical fantasy play experience comprising the following steps:

moving, touching, shaking, twisting and/or pointing a hand-held wireless wand actuator in a predetermined learned manner to thereby cause said wireless wand actuator to emit a particular desired wireless actuation signal, said wireless actuation signal conveying at least a portion of information identifying said wand actuator and/or a user of said wand actuator;

receiving said wireless actuation signal;

communicating said received wireless actuation signal to a control module operatively associated with one or more interactive play effects; and actuating or controlling said one or more interactive play effects in accordance with the received wireless actuation signal to create a seemingly magical experience.

73. The method of claim 72 wherein said wand actuator comprises an elongated rod having an RFID tag transponder at the tip thereof which play participants may selectively bring into proximity with a wireless receiver or reader device.

74. The method of claim 73 comprising the further step of hiding or concealing one or more of said wireless receiver or reader devices within a play facility or play structure in such a manner that they can be discovered by one or more play participants using said wireless wand actuator.

75. The method of claim 71 comprising the further step of creating or defining information representing an imaginary role play game character and wherein at least one of said interactive play effects comprises awarding certain enhanced attributes or abilities to said game character.

76. The method of claim 75 comprising the further step of storing or recording said information representing an imaginary role play game character on one or more electronically readable role-play cards comprising a paper, cardboard or plastic substrate having a front side and a back side, the front side being imprinted with graphics, photos, or other information representative of a desired role-play character and an RF tag programmable to contain certain character attributes and whereby the stored character attributes may be transported to RF-equipped play facilities, computer games, video games, home game consoles, and/or hand-held game units.

77. The method of claim 71 wherein at least one of said interactive play effects comprises an access control device for allowing or denying access to one or more other of said interactive play effects.

* * * * *